(12) United States Patent
Arai et al.

(10) Patent No.: US 6,392,702 B1
(45) Date of Patent: *May 21, 2002

(54) IMAGE PICKUP APPARATUS WITH LENS UNIT DETECTION AND RECORDING

(75) Inventors: Hideyuki Arai, Kawasaki; Kenji Kyuma, Yokohama; Koji Tajima, Musashino; Ryunosuke Iijima, Ebina, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/744,710

(22) Filed: Nov. 5, 1996

Related U.S. Application Data

(63) Continuation of application No. 08/174,623, filed on Dec. 23, 1993, now Pat. No. 5,600,371, which is a continuation of application No. 07/773,709, filed on Oct. 9, 1991, now abandoned.

(30) Foreign Application Priority Data

| Oct. 15, 1990 | (JP) | 2-273358 |
| Oct. 15, 1990 | (JP) | 2-273359 |
| Oct. 15, 1990 | (JP) | 2-273360 |
| Oct. 15, 1990 | (JP) | 2-273361 |
| Oct. 15, 1990 | (JP) | 2-273362 |
| Nov. 6, 1990 | (JP) | 2-299029 |
| Nov. 6, 1990 | (JP) | 2-299030 |
| Nov. 30, 1990 | (JP) | 2-333842 |

(51) Int. Cl.$^7$ .......................... G02B 13/16; H04N 5/225
(52) U.S. Cl. .......................................... 348/335; 348/360
(58) Field of Search ................................ 348/335, 360, 348/207, 373, 341, 175, 176, 177, 178, 189, 371; 354/286; 396/148, 296, 529; 352/142

(56) References Cited

U.S. PATENT DOCUMENTS

| 4,782,335 A |   | 11/1988 | Gussin ........................ 340/709 |
| 4,782,355 A | * | 11/1988 | Sakai et al. .................. 348/371 |
| 4,845,522 A |   | 7/1989 | Kataoka ...................... 354/412 |
| 4,896,181 A |   | 1/1990 | Saegusa ...................... 354/286 |
| 4,922,283 A |   | 5/1990 | Fukui .......................... 354/484 |
| 5,036,399 A | * | 7/1991 | Mabuchi ..................... 396/529 |
| 5,122,880 A | * | 6/1992 | Nagano ...................... 348/335 |
| 5,161,026 A | * | 11/1992 | Mabuchi et al. ............ 348/335 |
| 5,402,174 A | * | 3/1995 | Takahashi ................... 396/529 |
| 5,600,371 A | * | 2/1997 | Arai et al. ................... 348/335 |

* cited by examiner

Primary Examiner—Wendy R. Garber
Assistant Examiner—Luong Nguyen
(74) Attorney, Agent, or Firm—Robin, Blecker & Daley

(57) ABSTRACT

In a video camera apparatus having a camera main-body unit and a lens unit detachably mounted on the camera main-body unit, a state of the lens unit attached to or detached from the camera main-body unit is determined. If the lens unit is not accurately attached to the camera main-body unit, a power supply is controlled and various driving units in the lens unit are disabled or set in a state of low power consumption. At the same time, picture recording is prohibited on the camera main-body unit side, and a nonmounting state of the lens is displayed.

45 Claims, 12 Drawing Sheets

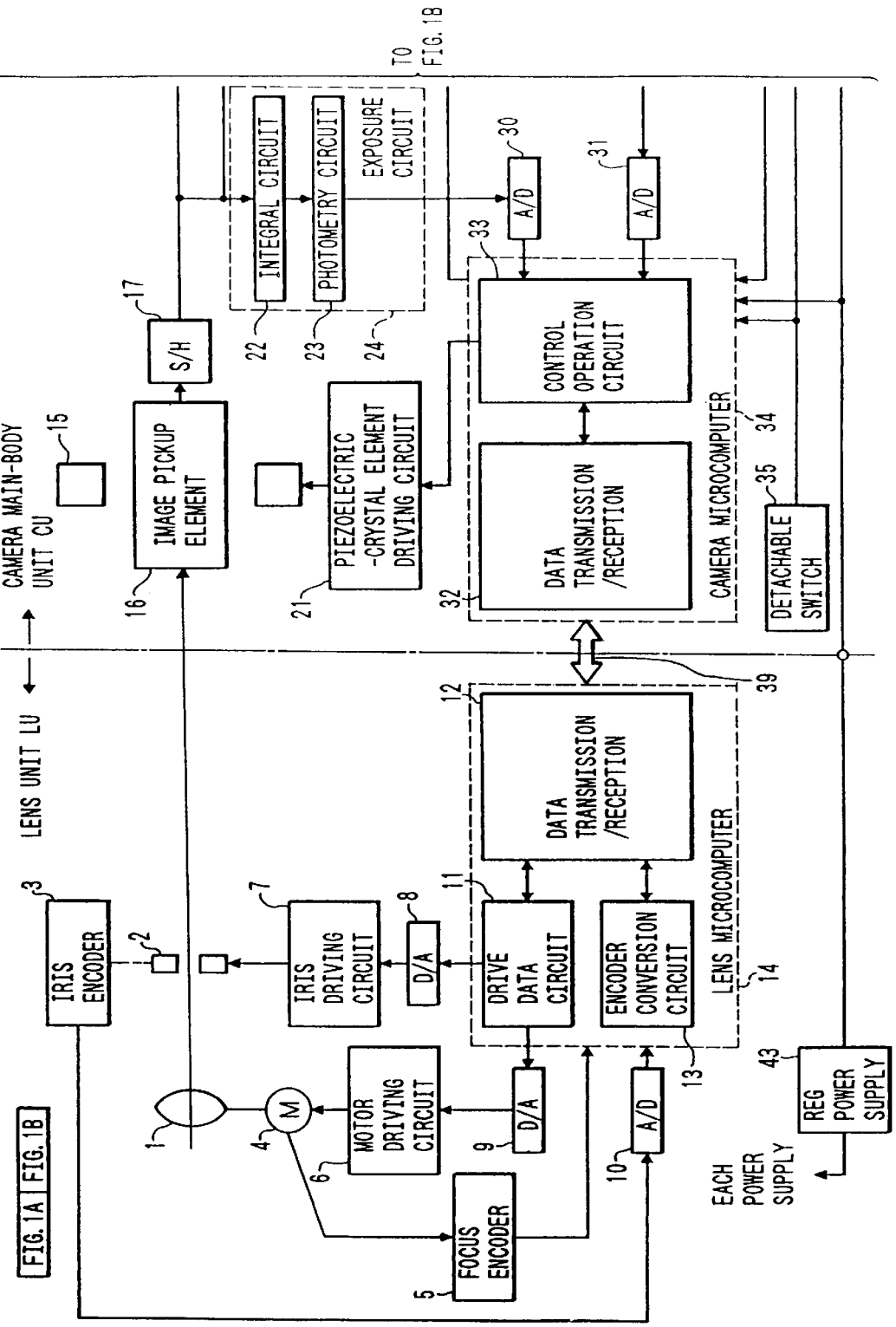

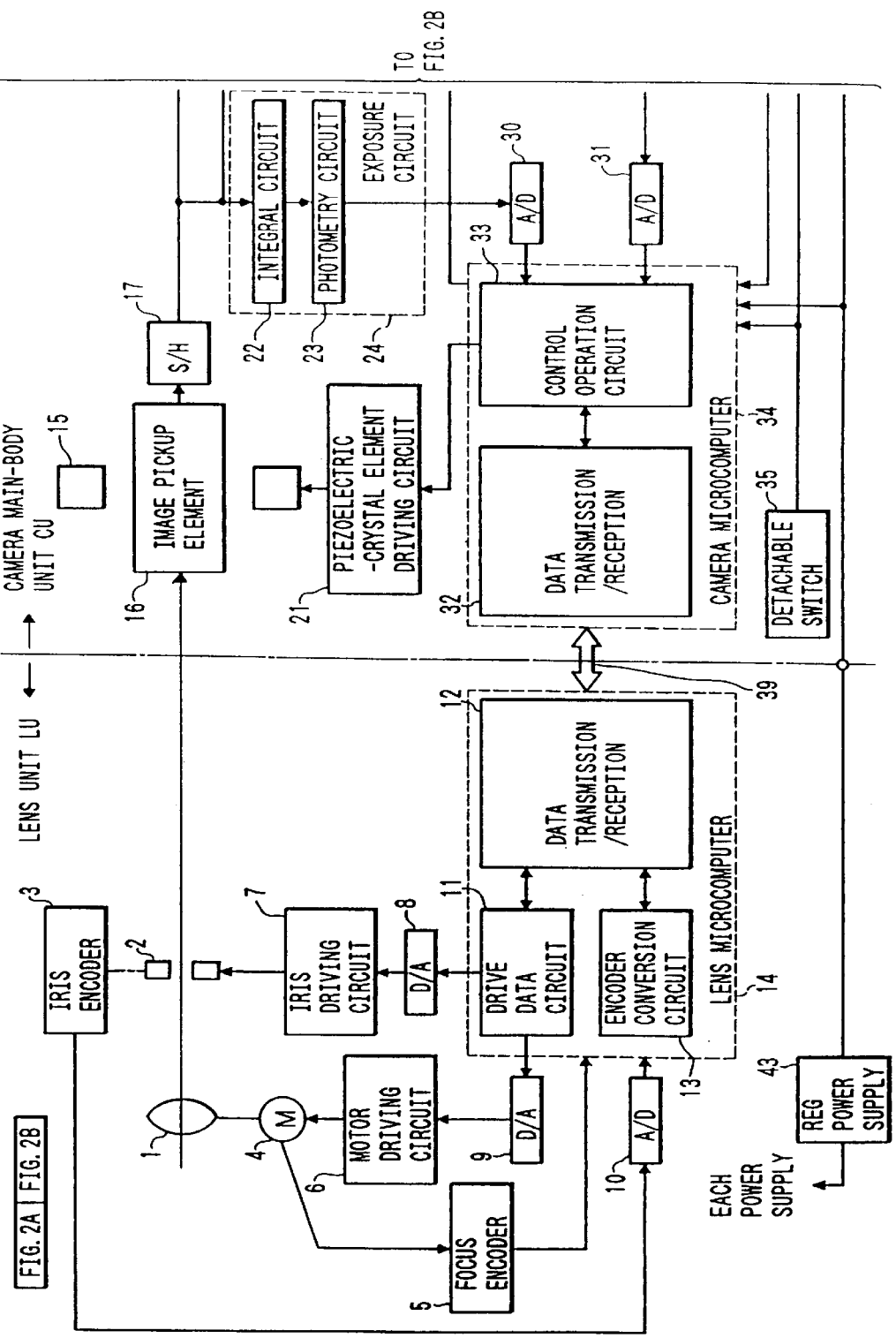

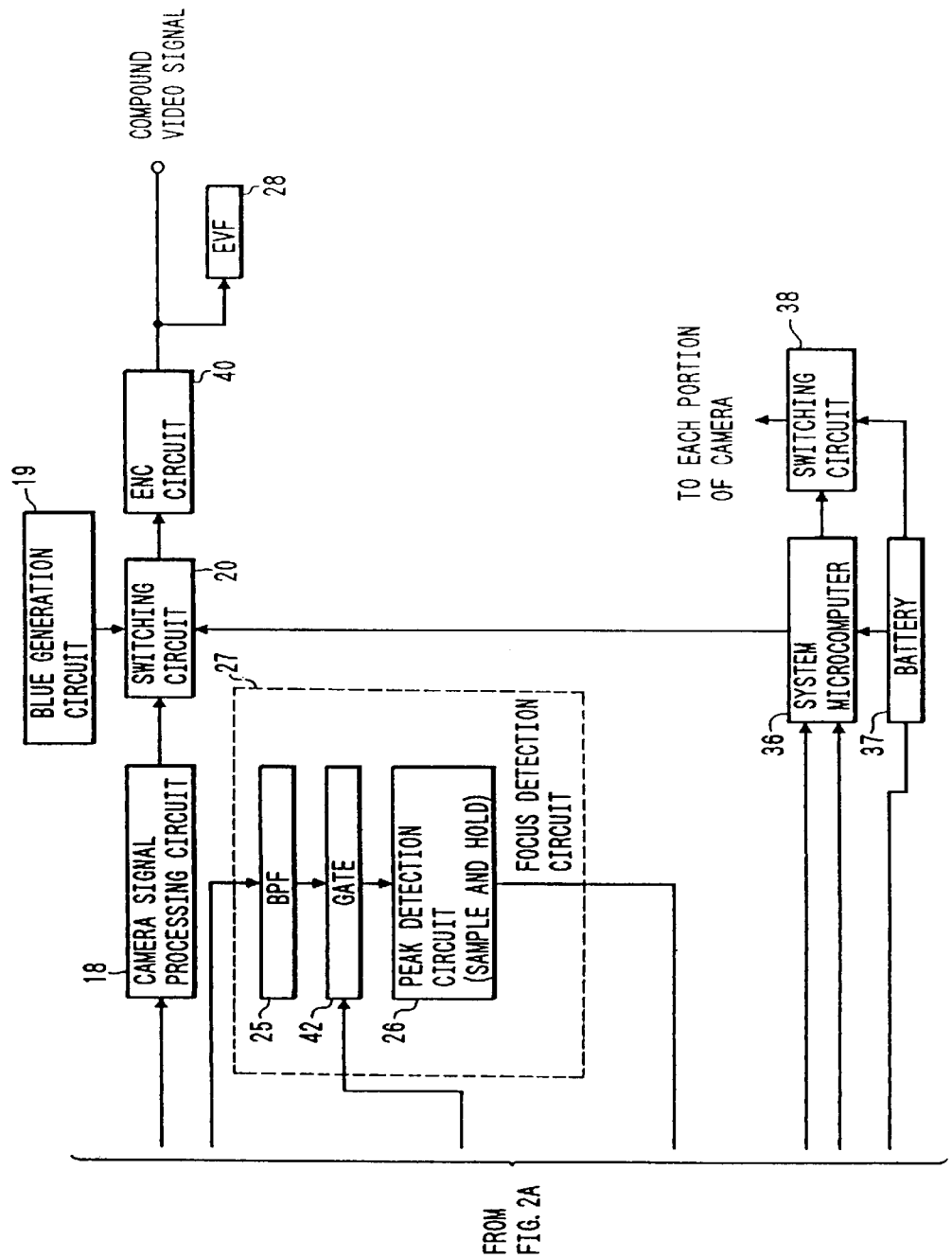

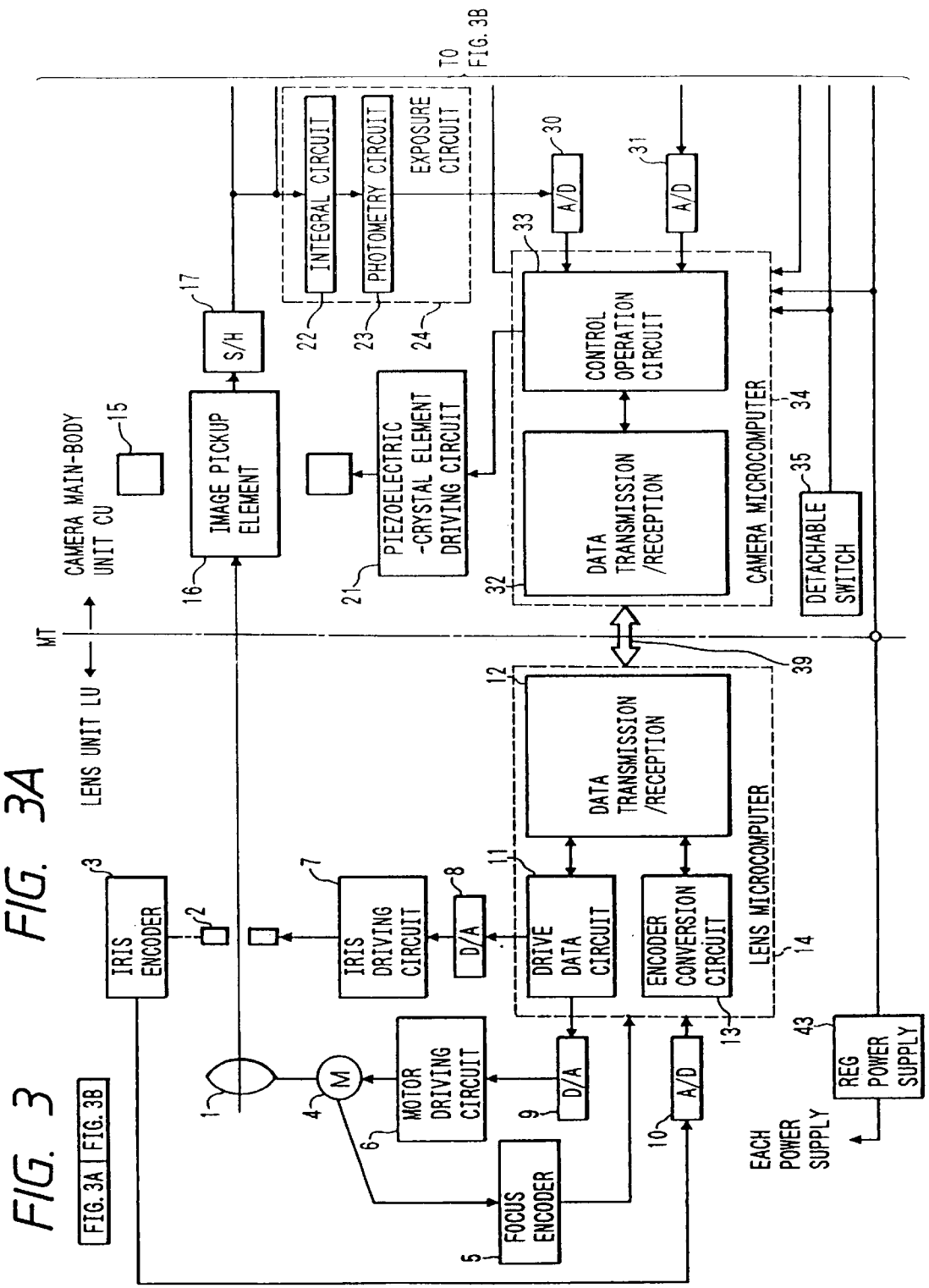

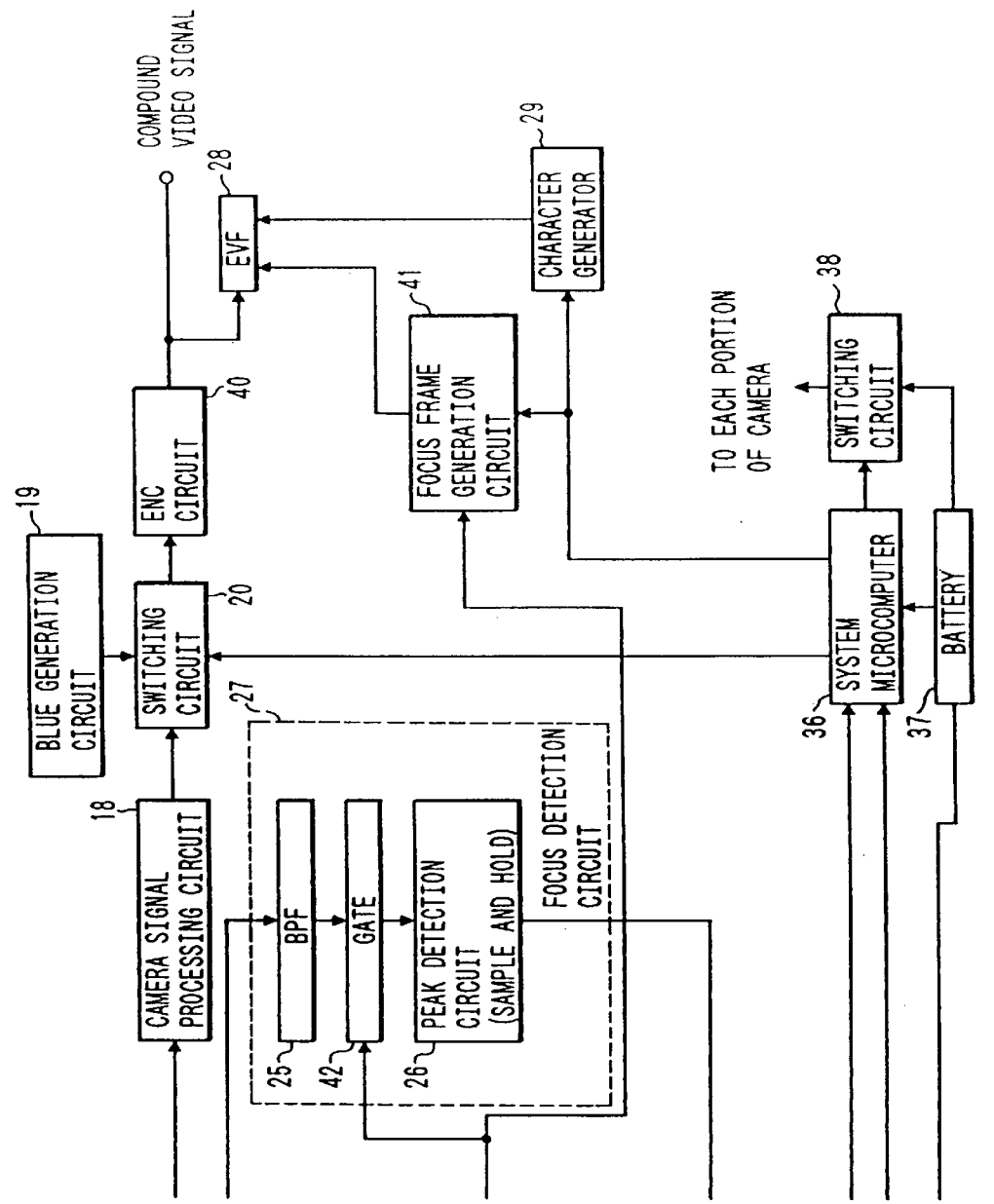

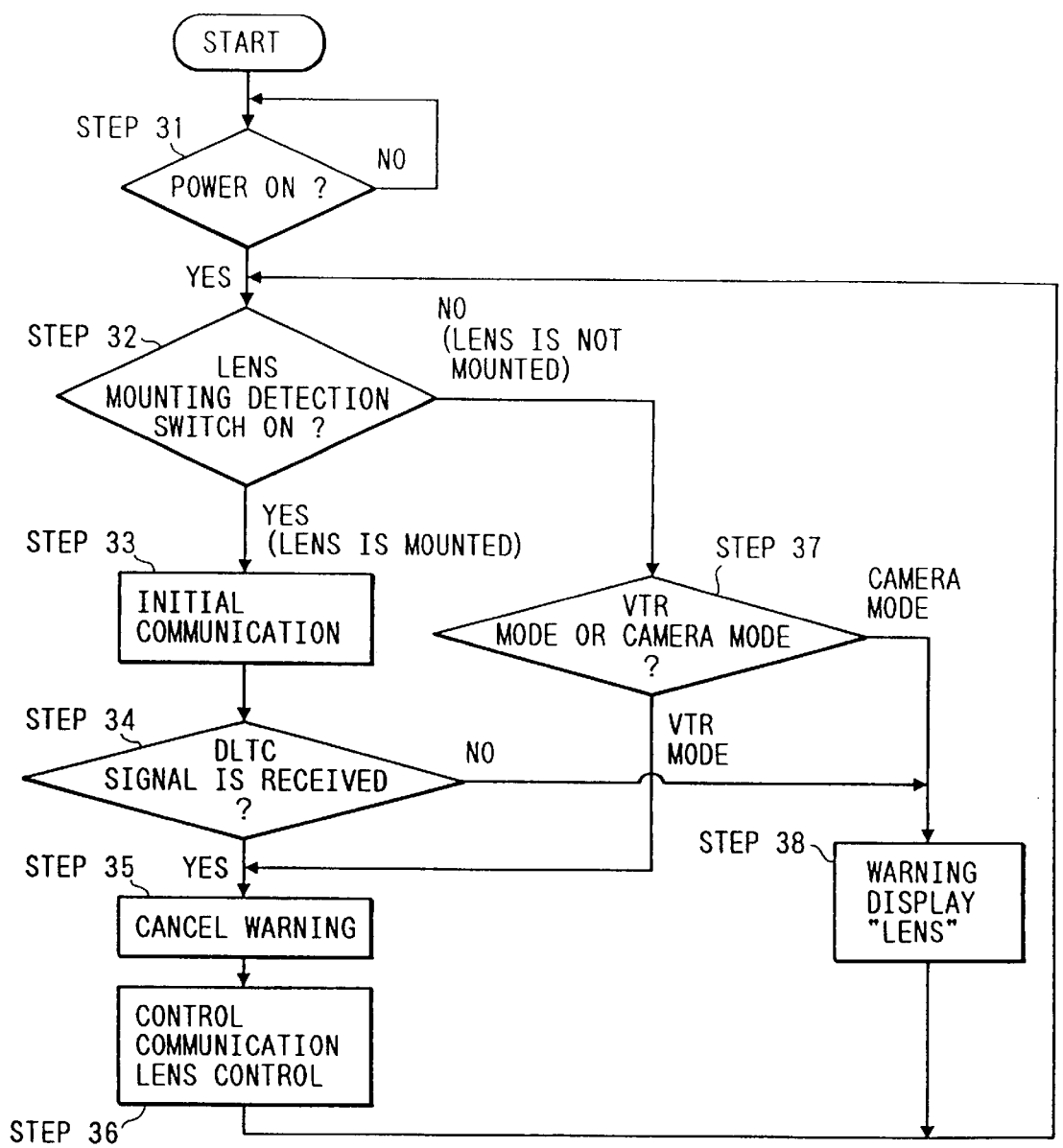

IMAGE PICKUP APPARATUS WITH LENS UNIT DETECTION AND RECORDING

This is a continuation application under 37 CFR 1.60 of prior application Ser. No. 08/174,623, filed Dec. 23, 1993 now U.S. Pat No. 5,600,371, which is a continuation of Ser. No. 07/773,709, filed Oct. 9, 1991, abandoned.

BACKGROUND OF THE INVENTION

1. Field of the Invention

The present invention relates to an image pickup (photographic) apparatus such as a video camera and, more particularly, to an image pickup apparatus in which a lens unit is interchangeable with respect to a camera main-body unit.

2. Related Background Art

A conventional video camera arranged as a camera built-in VTR cannot generally interchange lenses. As in a still camera using a silver chloride film, it is not easy to perform telephoto or wide-angled photography, thus narrowing a photographic range. A camera built-in VTR having interchangeable lenses is recently available on the market. However, this VTR does not have an auto-focus (AF) function and an auto-iris (auto-exposure or AE) function.

The present inventors have made extensive studies on developing a lens-interchangeable video camera having a lens unit which incorporates a photographic lens and an iris and which is detachable and interchangeable with respect to a camera main-body unit incorporating an image pickup element. In this video camera, a control unit including a microcomputer is arranged in each of the camera main-body unit and a lens unit. When the camera main-body unit is connected to the lens unit, the control units therein are connected through a data transmission line (communication line). In the camera main-body unit, a field brightness value from an image pickup element is detected, and an exposure operation is performed by the control unit in the camera main-body unit on the basis of the detected field brightness value. This exposure operation result is transmitted to the control unit in the lens unit. The control unit in the lens unit determines an iris opening amount on the basis of the exposure operation result and drives an iris driving means in accordance with the determined opening amount. The band of the field brightness signal in the camera main-body unit is limited by a plurality of band-pass filters. A focus operation of the control unit in the camera main-body unit is performed on the basis of the band-limited signal, and the operation result is transmitted to the control unit in the lens unit. The direction and speed of a focus motor are determined on the basis of the focus operation result in the control unit in the lens unit. A focus driving means is driven in accordance with the determined direction and speed.

In the lens-interchangeable image pickup apparatus having the exposure control system and the focus control system described above, when a user or photographer keeps disconnecting the lens unit from the camera main-body unit while the power switch of the lens unit is kept on, wasteful power is consumed, and a photographic time is undesirably shortened. Since electrical contacts of the mounting unit are exposed to the outer air, when the electrical contacts are short-circuited, the camera main-body unit is undesirably damaged.

In the lens-interchangeable video camera, picture recording is performed while the lens is properly mounted. If the lens is detached from the main-body or incomplete electrical connections occur between the lens and the camera main-body, the lens is set in an uncontrollable state. At this time, when the user erroneously touches a pushbutton type picture recording switch, an unnecessary picture is recorded although an optimal photographic operation cannot be performed. In this case, in order to erase the unnecessary recorded portion, a predetermined operation such as rewinding must be performed.

In the lens-interchangeable video camera, when the picture recording switch is touched in a lens uncontrollable state, picture recording is performed in a state except for the optimal photographic state, a cumbersome operation such as erasure of the unnecessary recorded portion must be undesirably performed.

SUMMARY OF THE INVENTION

The present invention has been made in consideration of the above problems, and has as its first object to provide an lens-interchangeable image pickup apparatus which can reduce wasteful power consumption upon detachment of a lens unit from a camera main-body unit and which does not damage the camera main-body unit even if electrical contacts of a mounting unit are accidentally short-circuited.

It is the second object of the present invention to provide an image pickup apparatus wherein a state of a lens unit attached to or detached from a camera main-body unit is determined and a switching means for supplying a drive power supply voltage from a main power supply in the camera main-body unit to each portion is controlled on the basis of the determination result, wasteful power consumption upon detachment of the lens unit from the camera main-body unit can be reduced, and damage to the camera main-body unit can be prevented even if electrical contacts of a mount unit are accidentally short-circuited.

In order to achieve the first and second objects according the present invention, there is disclosed an image pickup apparatus comprising a camera main-body unit, a lens unit detachable from the camera main-body unit, attachment/detachment determining means for determining a state of the lens unit attached to or detached from the camera main-body unit, switching means for supplying a drive power supply voltage from a main power supply in the camera main-body unit to each portion, and control means for controlling the switching means in accordance with a determination result from the attachment/detachment determining means.

The attachment/detachment determining means determines the state of the lens unit attached to or detached from the camera main-body unit, and the control means controls the switching means for supplying the drive power supply voltage from the main power supply in the camera main-body unit to each portion on the basis of the determination result.

The present invention has also been made in consideration of the conventional problems described above, and has as its third object of the present invention to provide a lens-interchangeable image pickup apparatus which can prevent a wasteful flow of a drive current when a lens unit is kept detached from a camera main-body unit, which has low power consumption, and which can prolong a photographic time.

It is the fourth object of the present invention to provide an image pickup apparatus wherein a state of a lens unit attached to or detached from a camera main-body unit is determined, a driving means for changing a focus state of a light-receiving surface of an image pickup element is controlled to stop the driving means upon detachment of the lens unit from the camera main-body unit, so that a wasteful flow of a drive current upon detachment of the lens unit from the camera main-body unit can be reduced, and the photographic time can be prolonged.

In order to achieve the third and fourth objects of the present invention, there is provided an image pickup apparatus comprising a camera main-body unit having an image pickup element, a focus-controllable lens unit detachably mounted on the camera main-body unit, attachment/detachment determining means for determining a state of the lens unit attached to or detached from the camera main-body unit, driving means for changing a focus state of a light-receiving surface of the image pickup element, and control means for controlling the driving means, wherein the driving means is disabled when the lens unit is detached from the camera main-body unit, so that the state of the lens unit attached to or detached from the camera main-body unit can be determined, and the control means controls the driving means for changing the focus state of the light-receiving surface of the image pickup element, whereby the driving means is disabled when the lens unit is detached from the camera main-body unit.

It is the fifth object of the present invention to provide an image pickup apparatus capable of reducing wasteful power consumption upon detachment of a lens unit from a camera main-body unit, prolonging a photographic time, and changing a focus state of a light-receiving surface of an image pickup element by appropriate driving upon attachment of the lens unit to the camera main-body unit.

It is the sixth object of the present invention to provide an image pickup apparatus capable of reducing wasteful power consumption upon detachment of a lens unit from a camera main-body unit, prolonging a photographic time, and changing a focus state of a light-receiving surface of an image pickup element by an appropriate drive amount upon attachment of the lens unit to the camera main-body unit.

In order to achieve the fifth and sixth objects of the present invention, there is disclosed an image pickup apparatus a camera main-body unit having an image pickup element, a focus-controllable lens unit detachably mounted on the camera main-body unit, attachment/detachment determining means for determining a state of the lens unit attached to or detached from the camera main-body unit, driving means for changing a focus state of a light-receiving surface of the image pickup element, and control means for controlling the driving means in accordance with a determination result from the attachment/detachment determining means, wherein the driving means is controlled by the same drive amount as required during manual focus control when the lens unit is detached from the camera main-body unit, so that the state of the lens unit attached to or detached from the camera main-body unit can be determined by the attachment/detachment determining means, and the control means controls the driving means for changing the focus state of the light-receiving surface of the image pickup element, whereby the driving means is controlled by the same drive amount as required during manual focus control when the lens unit is detached from the camera main-body unit.

It is the seventh object of the present invention to provide an image pickup apparatus capable of easily detecting a state of a lens unit attached to or detached from a camera main-body unit, preventing a photographic failure, and preventing a user or photographer from feeling anxiety or discomfort.

In order to achieve the seventh object of the present invention, there is provided an image pickup apparatus comprising a camera main-body unit, a lens unit detachable from the camera main-body unit, attachment/detachment determining means for determining a state of the lens unit attached to or detached from the camera main-body unit, video signal generating means for outputting a desired video signal, switching means for switching between the video signal and the picked video signal, and control means for controlling the switching means in accordance with a determination result from the attachment/detachment determining means, wherein the desired video signal not associated with the image pickup signal is output when the lens unit is detached from the camera main-body unit, thereby preventing an output of uncomfortable noise on a picture.

In order to achieve the above object according to the present invention, there is disclosed an image pickup apparatus comprising a camera main-body unit having an image pickup element, a focus-controllable lens unit detachably mounted on the camera main-body unit, attachment/detachment determining means for determining a state of the lens unit attached to or detached from the camera main-body unit, a gate circuit for performing the focus control in an arbitrary area in an image pickup frame, an focus frame generation circuit for outputting a focus frame signal for displaying the arbitrary area, and a control unit for controlling the focus frame generation circuit in accordance with a determination result from the attachment/detachment determining means, wherein the state of the lens unit attached to or detached from the camera main-body unit can be easily detected in accordance with a state of the focus frame.

It is the eighth object of the present invention to provide a lens-interchangeable video camera which prohibits picture recording in a lens uncontrollable state and eliminating a cumbersome operation for erasing an unnecessary portion.

In order to achieve the eighth object of the present invention, there is disclosed a video camera having a photographic lens detachably mounted on a camera main-body unit, comprising means for discriminating a state of the lens as a lens controllable or uncontrollable state, and control means for prohibiting picture recording when the lens is set in the uncontrollable state, wherein the discriminating means discriminates that the lens is in the lens controllable or uncontrollable state, and picture recording is prohibited when the lens is set in the lens uncontrollable state.

It is the ninth object of the present invention to provide a lens-interchangeable video camera wherein picture recording is set in a waiting state when the lens is set in a lens uncontrollable state, and a cumbersome operation for erasing the unnecessary part need not be performed.

In order to achieve the ninth object of the present invention, there is provided a video camera having an image pickup lens detachably mounted on a camera main-body unit, comprising means for discriminating a state of the lens as a lens controllable or uncontrollable state, and control means for setting picture recording in a waiting state during picture recording when the lens is set in the uncontrollable state, wherein the discriminating means discriminates that the lens is in the lens controllable or uncontrollable state, and picture recording is set in the waiting state when the lens is set in the lens uncontrollable state.

It is the tenth object of the present invention to provide a video camera apparatus effectively used in, particularly, a camera built-in video tape recorder for outputting a warning display during reproduction of recorded information without degrading the picture quality since the warning display is performed during detachment of a lens unit from a camera main-body unit upon detection of attachment/detachment of the lens unit so as to easily and accurately determine the lens attachment state, and since whether a lens detachment warning message is displayed is selected in accordance with a mode of the apparatus.

It is the eleventh object of the present invention to provide a video camera apparatus wherein lens mounting is detected by using two detecting means, reliability of detection can be improved, and at the same time, contamination and defects of contacts, and the lens failure can be easily found.

In order to achieve the tenth and eleventh objects of the present invention, there is disclosed an interchangeable lens type camera apparatus comprising a lens unit, a camera main-body unit on which the lens is detachably mounted, means for detecting a state of the lens unit attached to or detached from the camera main-body unit, means for determining whether a warning display is performed when the detachment of the lens unit is detected by the detecting means, and display means for performing the warning display on the basis of an output from the determining means.

In order to achieve the tenth and eleventh objects of the present invention, there is also disclosed an interchangeable lens type camera apparatus comprising a lens unit, a camera main-body unit on which the lens unit is detachably mounted, communicating means for transmitting driving control information from the camera main-body unit to the lens unit and sending back information representing an operating state of the lens unit to the camera main-body unit, first detecting means for detecting an attachment state of the lens unit with respect to the camera main-body unit, second detecting means for detecting an attachment state of the lens unit with respect to the camera main-body unit through the communicating means, and display means for performing a warning display when the state of the lens unit detached from the camera main-body unit is detected on the basis of the detection results from the first and second detecting means.

The above and other objects, features, and advantages of the present invention will be apparent from the detailed description of the present invention in conjunction with the accompanying drawings.

BRIEF DESCRIPTION OF THE DRAWINGS

FIG. 2 is a block diagram showing the second embodiment of the present invention;

FIG. 3 is a block diagram showing the third embodiment of the present invention;

FIG. 10 is a flow chart for explaining an operation according to the present invention.

DETAILED DESCRIPTION OF THE PREFERRED EMBODIMENTS

Image pickup apparatuses according to preferred embodiments of the present invention will be described with reference to the accompanying drawings.

Figure 1B:
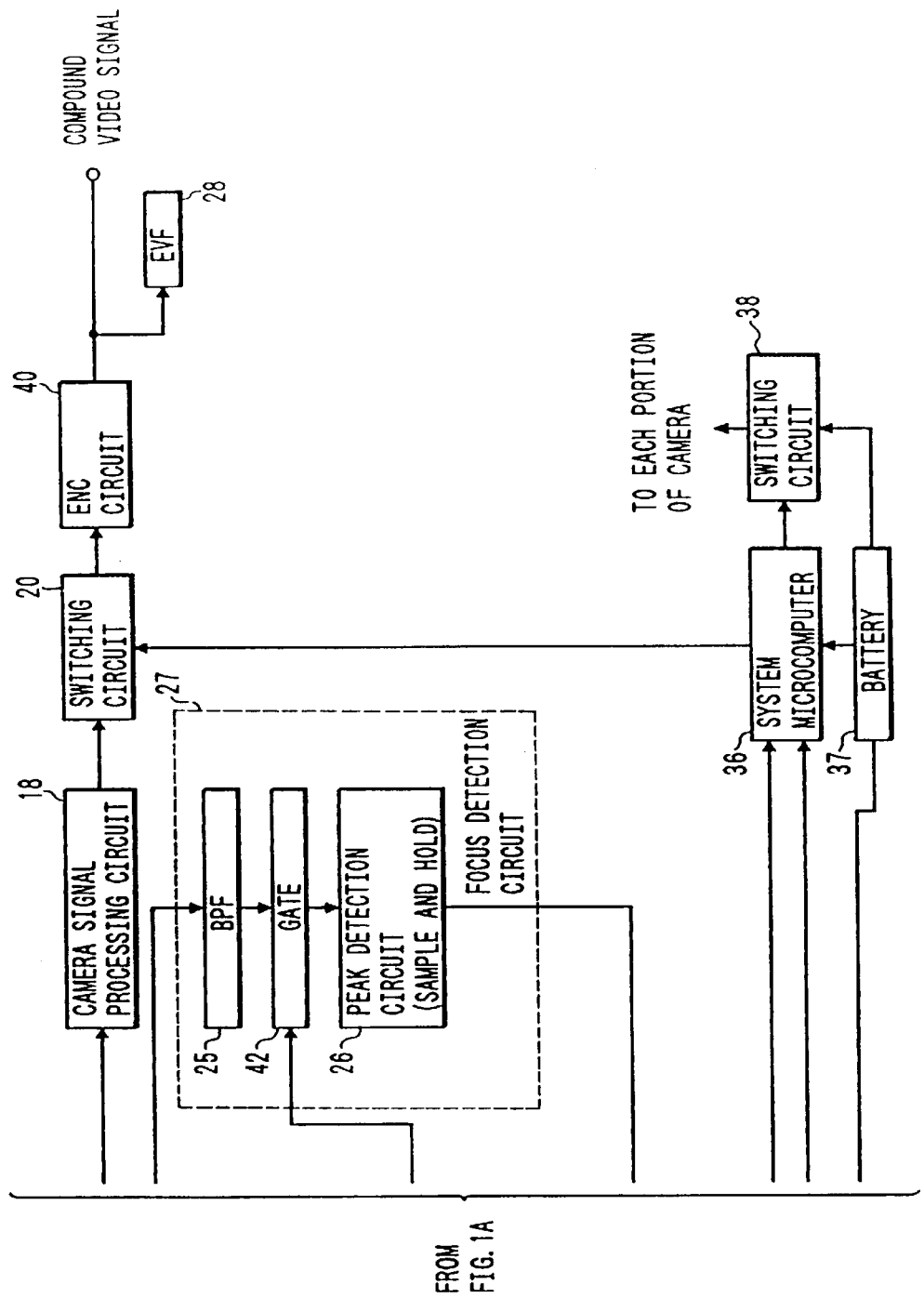
FIG. 1 is a block diagram showing the first embodiment of the present invention.

FIG. 1 is a block diagram showing a circuit arrangement of an image pickup apparatus according to the first embodiment of the present invention. More particularly, FIG. 1 shows the main part of a lens-interchangeable video camera. This video camera includes a camera main-body unit CU and a lens unit LU detachably mounted on the camera main-body unit CU. The units CU and LU are mechanically and detachably connected through a known mounting unit MT in which press contact terminals of the units CU and LU are arranged. A data transmission path 39 for performing serial data transmission is formed between a microcomputer 14 serving as a control unit arranged in the lens unit LU and a microcomputer 34 serving as a control unit in the camera main-body unit CU through the mutual press contacts.

In addition to the lens microcomputer 14, the lens unit LU includes a photographic lens 1, an iris 2 for performing exposure control, an iris encoder 3 for detecting an iris opening amount (iris value), a focus motor (M) 4 for controlling a focal point, a focus encoder 5 for detecting a focus lens position, a motor driving circuit 6 for driving the focus motor 4, an iris driving circuit 7 for driving the iris 2, D/A converters 8 and 9 for converting digital signals into analog signals, and an A/D converter 10 for converting an analog signal into a digital signal. The lens microcomputer 14 comprises a drive data circuit 11 for outputting drive data for the lens 1 and the iris 2, a data transmission/reception circuit 12 for-performing data transmission and reception, and an encoder conversion circuit 13 for converting detection values from the focus encoder and the iris encoder into data operable in the lens microcomputer 14.

In addition to the camera microcomputer 34, the camera main-body unit CU includes an image pickup element 16 comprising, e.g., a CCD for photoelectrically converting optical image information, i.e., a beam of image pickup light incident through the lens 1 and the iris 2, into an image pickup signal, a piezoelectric-crystal element 15 for vibrating the image pickup element 16 in an axial direction to modulate the image pickup element so as to obtain near-or far-focus information, a sample and hold (S/H) circuit 17 for sampling and holding an output signal from the image pickup element 16, a camera signal processing circuit 18 for receiving a picture signal output from the S/H circuit 17 and outputting a luminance signal and chrominance signals, a piezoelectric-crystal element driving circuit 21 serving as a modulating means for vibrating the image pickup element 16 at a predetermined period and periodically changing a focus state of a light-receiving surface of the image pickup element 16, an exposure circuit 24 for obtaining an optimal exposure value from an output from the S/H circuit 17, and a focus detection circuit 27 for obtaining an optimal focus state from the output from the S/H circuit 17. The exposure circuit 24 comprises an integral circuit 22 for integrating the image pickup signal, and a photometry circuit 23 for performing photometry on the basis of an average luminance level output from the integral circuit 22. The focus detection circuit 27 comprises a plurality of BPFs (Band-Pass Filters) 25 for limiting the band of signals so as to extract frequency components changing in accordance with focus states, a peak detection circuit 26 for sampling and holding output signals from the BPFs 25 to detect a peak, and a gate circuit 42, arranged between the BPFs 25 and the peak detection circuit 26, for determining an area subjected to focus detection in the image pickup area. In addition, the camera main-body unit CU includes A/D converters 30 and 31, a detachable switch (attachment/detachment determining means) 35 for determining the lens unit LU attached to or detached from the camera main-body unit CU (in this case, the switch 35 determines whether the lens unit LU is normally connected to the camera-body unit), a microcomputer (to be referred to as a system microcomputer) 36 for controlling the overall operation of the camera system, a battery 37 serving as a main power supply, a switching circuit (switching means) 38 for supplying a drive power supply voltage from the battery 37 to each camera portion, a switching circuit 30 for a signal controlled by the system microcomputer 36, an encoder (ENC) for outputting a composite video signal, and an EVF circuit 28 for monitoring a picture on a viewfinder. The camera microcomputer 34 includes a data transmission/reception circuit 32, and a control operation circuit 33 for performing various arithmetic operations of control information transmitted to the lens side and control information received from the lens side.

The system microcomputer 36 in the camera main-body unit CU serves as a control means for controlling the switching circuit 38 in accordance with an ON/OFF signal as a determination result from the detachable switch 35. A power supply voltage is supplied from the battery 37 to a regulator (REG) power supply 43 in the lens unit LU. Power is supplied from the REG power supply 43 to each power supply.

An operation of the video camera will be described below.

When the lens unit LU is normally attached to the camera main-body unit CU, a beam of image pickup light incident on the image pickup element 16 through the photographic lens 1 and the iris 2 is photoelectrically converted by the image pickup element 16. A picture signal is output from the image pickup element 16. This picture signal is input to the camera processing circuit 18 through the S/H circuit 17. Gamma conversion and the like of the picture signal are performed by the camera processing circuit 18, and the input signal is separated into chrominance signals C and a luminance signal $Y_\gamma$. The chrominance signals C and the luminance signal $Y_\gamma$ ate converted into a composite video signal by the encoder circuit 40 and are monitored on a viewfinder by the EVF circuit 28.

A luminance signal Y output from the S/H circuit 17 is input to the exposure circuit 24 and is integrated by the integral circuit 22 in the exposure circuit 24 to obtain an average luminance level. The photometry circuit 23 performs photometry and outputs an optimal photometry signal. This signal is converted into a digital signal by the A/D converter 30, and this digital signal is input to the control operation circuit 33 in the camera microcomputer 34. A predetermined exposure operation is performed in the camera microcomputer 34. As a result of the operation, an iris control signal is output to the data transmission/reception circuit 32 in the camera microcomputer 34. This signal is supplied to the lens microcomputer 14 in the lens unit LU through the data transmission line 39. At this time, when electrical connection between the lens unit LU and the camera main-body unit CU is stabilized, for example, when a predetermined period of time has elapsed after the lens unit LU is mounted on the camera main-body unit CU, or when no abnormality occurs in the power supply in the camera main-body unit CU, the lens microcomputer 14 calculates an iris driving amount on the basis of an iris control signal sent from the camera microcomputer 34. An iris drive signal obtained as a result of this arithmetic operation is output from the drive data circuit 11. This signal is converted into an analog signal by the D/A converter 8, and the analog signal is input to the iris driving circuit 7, thereby driving the iris 22. A movement amount of the iris 2 is detected by the encoder 3, and its detection signal is converted into a digital signal by the A/D converter 10. This digital signal is input to the lens microcomputer 14. This input signal is converted into an iris state signal through the encoder conversion circuit 13 in the lens microcomputer 14. This signal is transmitted to the camera microcomputer 34 through the data transmission line 39.

Optimal iris control is performed by the above operations. Similar operations will be performed for focus control. More specifically, the luminance signal Y output from the S/H circuit 17 is also input to the focus detection circuit 27 for obtaining an optimal focus state. The input signal is band-limited by the plurality of BPFs 25 so as to extract frequency components having different characteristics changing in accordance with a focus state. The outputs from the BPFs 25 are gated by the gate circuit 42, so that only a signal corresponding to the area subjected to focus detection on the frame is input to the peak detection circuit 26. The peak detection circuit 26 outputs an optimal focus voltage signal. This signal is converted into a digital signal by the A/D converter 31, and the digital signal is input to the camera microcomputer 34. The camera microcomputer 34 performs a predetermined arithmetic operation by the control operation circuit 33. Focus voltage data obtained as a result of this arithmetic operation is input from the data transmission/reception circuit 32 to the lens microcomputer 14 through the data transmission line 39. In addition, this data is also input to the D/A converter 9 through the data transmission/reception circuit 12 and the drive data circuit 11 and is converted into an analog signal. This analog signal is supplied to the motor driving circuit 6, thereby driving the focus motor 4 and hence performing focus control. A focus state,is detected by the focus encoder 5, and a detection signal is input to the lens microcomputer 14. The input signal is converted by the encoder conversion circuit 13, and is transmitted to the camera microcomputer 34 through the data transmission/reception circuit 12 and the data transmission line 39.

By the above series of closed loop operations, the optimal iris control and focus control can be performed in the lens-interchangeable video camera.

The above description has been made under the condition that the lens unit LU is normally mounted on the camera main-body unit CU. When the lens unit LU is kept detached from the camera main-body unit CU, the above normal camera operations are not performed. When the lens unit LU is kept detached from the camera main-body unit CU, it is effective to disable the respective portions of the camera main-body unit CU so as to reduce the power consumption. In this embodiment, the respective portions of the camera main-body unit CU are always powered from the battery 37. However, when the detachable switch 35 detects that the lens unit LU is kept detached from the camera main-body unit CU, this information is transmitted to the system microcomputer 36. At this time, the system microcomputer 36 outputs a control signal to the switching circuit 38 to prohibit supply of power supply voltages from the battery 37 to the camera portions, thereby preventing the drive current from flowing through the respective portions of the camera. Therefore, the wasteful power consumption can be reduced, and at the same time, even if the exposed electrical contacts of the mounting unit MT are accidentally short-circuited, no current flows. The camera main-body unit CU can be prevented from damage and can be protected.

In the above embodiment, each portion of the camera is powered off through the switching circuit 38 by the system microcomputer 36, i.e., in accordance with a determination signal form the detachable switch 35, representing that the lens unit LU is kept detached from the camera main-body unit CU. However, an internal timer function of the system microcomputer 36 may be used, and when a predetermined period of time has elapsed upon reception of the determination signal, each portion of the camera may be powered off. Even if a user keeps detaching the lens unit LU from the camera main-body unit CU due to some reason, the power supply of each portion of the camera is stopped upon a lapse of the predetermined period of time. Therefore, damage to the camera main-body unit can be prevented.

Note that in the above description, although attachment/detachment of the lens unit LU is detected by the detachable switch 35, it can be determined by a state of communication between the camera microcomputer and the lens microcomputer.

FIG. 2 is a block diagram showing the second embodiment of the present invention. The same reference numerals as in FIG. 1 denote the same parts in FIG. 2. Referring to FIG. 2, a blue generation circuit 19 outputs a monochrome (blue) signal regardless of an output signal from a camera signal processing circuit 18.

When a lens unit LU is detached from a camera main-body unit CU or when an abnormality occurs in a data transmission line 39 due to some reason, e.g., when an incomplete electrical connection occurs in contact terminals between the lens unit LU and the camera main-body unit CU, failure information is immediately informed to the user in the embodiment of FIG. 2.

More specifically, when the lens unit LU is intentionally detached from the camera main-body unit CU, or when an abnormality occurs in the data transmission line 39, an information signal representing that the lens unit LU is not normally attached to the camera main-body unit CU is input from a detachable switch 35 or a camera microcomputer 34 to a system microcomputer 36. The system microcomputer 36 outputs a control signal to a switching circuit 38 to prohibit power supply to each camera portion. At the same time, the system microcomputer 36 outputs a control signal to a switching circuit 20 for a picture signal to switch a signal input to an encoder 40. At this time, the switching circuit 20 selects an output from the camera signal processing circuit 18 and outputs the selected signal to the encoder circuit 40 when the lens unit LU is normally attached to the camera main-body unit CU. However, when the control signal is input, a blue signal output from the blue generation circuit 19 is selected and is input to the encoder circuit 40. Therefore, a blue video signal is output from the output terminal, and a blue picture is monitored and displayed on the viewfinder by an EVF circuit 28. The user can visually check the displayed picture and knows that the lens unit LU is normally attached to the camera main-body unit CU. When the lens unit LU is kept detached from the camera main-body unit CU, a noise picture having poor quality will not be displayed.

As described above, the user can visually check that the lens unit LU is normally attached to the camera main-body unit CU, need not pay extra attention to photographic conditions, and does not feel anxiety.

In the above embodiment, a blue picture is displayed by the blue generation circuit 19. However, a picture having any color or a multicolor picture may be displayed.

FIG. 3 is a block diagram showing the third embodiment. A character generator 29 generates arbitrary character information. A focus frame generation circuit 41 generates a focus frame signal of a specific area. This focus frame corresponds to a focus detection area set on the image pickup area by a gate circuit 42 and is displayed on the monitor screen.

In this embodiment, as in the second embodiment, when a lens unit LU is kept detached from a camera main-body unit CU, or an abnormality occurs due to an incomplete connection of contact terminals to a data transmission line 39, this state is immediately informed to a user or photographer.

More specifically, a camera microcomputer 34 outputs a gate pulse to the gate circuit 42 to obtain a focus voltage signal in an arbitrary area within the viewfinder, and the gate circuit 42 gates band-limited signals from a plurality of BPFs 25 in response to this pulse signal. The focus frame generation circuit 41 outputs the focus frame signal to cause an EVF circuit 28 to display the gated area on the viewfinder. When the lens unit LU is not normally attached to the camera main-body unit CU, the detachable switch 35 and the camera microcomputer 34 supply this information to a system microcomputer 36, thereby disabling the output from the focus frame generation circuit 41. At the same time, character information representing that the lens unit LU is not normally attached to the camera main-body unit CU is output from the character generator 29 to the EVF circuit 28 to visually inform the user of this information through the viewfinder.

As described above, when the lens unit LU is not normally attached to the camera main-body unit CU, the focus frame is erased from the viewfinder, and at the same time the character information is displayed. Therefore, the user can more properly know that the lens unit LU is not normally attached to the camera main-body unit CU. In this case, a desired display can be performed by a blue generation circuit 19 and the like.

The fourth embodiment of the present invention will be described below.

An arrangement of this embodiment is the same as that in FIG. 1, and a detailed description thereof will be omitted. In this embodiment, when a lens unit LU is kept detached from a camera main-body unit CU, a piezoelectric-crystal element 15 required for focus control is driven with low power consumption so as to prevent wasteful power consumption.

As described above, in order to obtain an optimal focus state, an iris opening amount (iris value) is detected by an iris encoder 3 (FIG. 1), and its detection signal is converted into a digital signal by an A/D converter 10. The digital signal is input to a lens microcomputer 14 and is converted by an encoder conversion circuit 13 in the lens microcomputer 14. The converted data is input from a data transmission/reception circuit 12 to a camera microcomputer 34 through a data transmission line 39. The camera microcomputer 34 outputs a control signal to a piezoelectric-crystal element driving circuit 21 to change an amplitude of the piezoelectric-crystal element 15 in accordance with this iris value data, thereby driving the piezoelectric-crystal element 15.

That is, according to the present invention, near-or far-focus information is obtained, i.e., the drive direction of the focus lens is determined in accordance with a change in focus state upon back-and-forth movement of the image pickup element along the optical axis.

The amplitude of the vibration of this image pickup element, however, must be changed in consideration of the depth of field.

When the depth of field is large, a change in focus signal level (i.e., an output from a peak detection circuit) as a function of movement of the image pickup element along the axial direction is small. When the depth of field is small, a change in focus signal level as a function of movement of the image pickup element along the axial direction is increased.

In order to always obtain a modulated component upon vibration of the image pickup element in the image pickup signal, the amplitude of the vibration of the image pickup element must be changed in accordance with the depth of field (this change is increased when the depth of field is increased). For this reason, according to the present invention, the piezoelectric-crystal element driving circuit 21 is controlled in accordance with the iris value data to change the vibration amount of the piezoelectric-crystal element. In this case, when a detachable switch 35 outputs to the camera microcomputer 34 a state determination signal representing that the lens unit LU is detached from the camera main-body unit CU, the camera microcomputer 34 outputs a control signal to the piezoelectric-crystal element driving circuit 21 to prohibit driving of the piezoelectric-crystal element 15 regardless of the iris value data. Alternatively, the camera microcomputer 34 outputs a drive control signal having an any small value as in that in the manual focus mode.

When the lens unit LU is kept detached from the camera main-body unit CU, normal camera operations are not performed. When the lens unit LU is kept detached from the camera main-body unit CU, it is effective to disable each portion of the camera main-body unit CU so as to reduce the power consumption. For this reason, when the detachable switch 35 detects that the lens unit LU is detached from the camera main-body unit CU, its detection signal is input to the camera microcomputer 34. At this time, the camera microcomputer 34 outputs a stop signal to the piezoelectric-crystal element driving circuit 21 to stop driving the piezoelectric-crystal element driving circuit 21 and the piezoelectric-crystal element 15. Therefore, a wasteful flow of the drive current (vibration current) to the piezoelectric-crystal element 15 can be prevented, thereby reducing the power consumption and prolonging the photographic time.

In the above embodiment, the camera microcomputer 34 need not immediate stop driving the piezoelectric-crystal element driving circuit 21 in accordance with the determination signal output from the detachable switch 35 and representing that the lens unit LU is kept detached from the camera main-body unit CU. An internal timer function of the camera microcomputer 34 may be used to stop the piezoelectric-crystal driving circuit 21 upon a lapse of a predetermined period of time after the above determination signal is input. Even if the user keeps detaching the lens unit LU from the camera main-body unit CU due to some reason, the piezoelectric-crystal element driving circuit 21 is stopped with a lapse of a predetermined period of time, thereby preventing a wasteful current flow.

As described above, according to the present invention, the state of the lens unit attached to or detached from the camera main-body unit is determined, and the driving means for changing a focus state of the light-receiving surface of the image pickup element is controlled. The driving means is stopped when the lens unit is detached from the camera main-body unit. A wasteful drive current flow upon detachment of the lens unit from the camera main-body unit can be prevented, the power consumption is reduced, and the photographic time can be prolonged.

In the fifth embodiment of the present invention, a camera microcomputer 34 in a camera main-body unit CU constitutes a control means for controlling a piezoelectric-crystal element driving circuit 21 in accordance with an ON/OFF signal as a determination result of a detachable switch 35. When a lens unit LU is kept detached from the camera main-body unit CU, the piezoelectric-crystal element driving circuit 21 can be controlled by the same drive amount as in manual focus control.

When the lens unit LU is kept detached from the camera main-body unit CU, it is effective to disable each portion of the camera main-body unit CU so as to reduce power consumption. In this embodiment, when the detachable switch 35 detects that the lens unit LU is kept detached from the camera main-body unit CU, the detachable switch 35 supplies this detection signal to the camera microcomputer 34. At this time, the camera microcomputer 34 sends a control signal to the piezoelectric-crystal element driving circuit 21 to finely drive a piezoelectric-crystal element 15 having high power consumption as in the manual focus control. The wasteful power consumption can be reduced, and the photographic time can be prolonged. At the same time, when the lens unit LU is attached to the camera main-body unit CU, the focus state of the light-receiving surface of an image pickup element 16 can be immediately changed by appropriate driving. In addition, this can be achieved by adding a control switching subroutine to a main routine by simple programming.

In the above embodiment, the piezoelectric-crystal element 15 need not be immediately and finely driven through the piezoelectric-crystal element driving circuit 21 under the control of the camera microcomputer 34 in accordance with the determination signal output from the detachable switch 35 and representing that the lens unit LU is kept detached from the camera main-body unit CU. An internal timer function of the camera microcomputer 34 may be used, and the piezoelectric-crystal element driving circuit 21 is controlled to finely drive the piezoelectric-crystal element 15 upon a lapse of a predetermined period of time after the above determination signal is input. Therefore, even if the user keeps detaching the lens unit LU due to some reason, driving of the piezoelectric-crystal element 15 is limited with a lapse of the predetermined period of time, thereby reducing wasteful power consumption.

According to the present invention, as described above, the state of the lens unit attached or detached from the camera main-body unit is determined, and the driving means for changing the focus state of the light-receiving surface of the image pickup element is controlled in accordance with the determination result. When the lens unit is kept detached from the camera main-body unit, control is performed by the same drive amount as in manual focus control, thereby reducing the wasteful power consumption upon detachment of the lens unit and prolonging the photographic time. In addition, when the lens unit is attached to the camera main-body unit, the focus state of the light-receiving surface of the image pickup element can be immediately changed by an appropriate drive amount.

With this arrangement, the wasteful power consumption can be reduced as in each of the above embodiments. The camera main-body unit can be protected, and the photographic time can be prolonged.

According to the present invention, as described above, the state of the lens unit attached to or detached from the camera main-body unit is determined, and the switching means for supplying a drive power supply voltage from the main power supply in the camera main-body unit to each portion is controlled in accordance with this determination result. Therefore, the wasteful power consumption upon detachment of the lens unit can be reduced. In addition, even if the electrical contacts of the mounting unit are accidentally short-circuited, the camera main-body unit can be prevented from damage.

As described above, when the lens unit LU is detached from the camera main-body unit CU and any abnormality occurs in a data transmission line 39, e.g., when an incomplete connection of contact terminals of the lens unit LU and the camera main-body unit CU occurs, the focus driving system is controlled as described above. At the same time, the failure information is immediately informed to the user. Since a blue generation circuit 19 is arranged in the apparatus, a blue picture can be monitored and displayed on the viewfinder when the lens unit LU is kept detached from the camera main-body unit CU. Alternatively, a picture of a color different from blue or a multicolor picture may be displayed on the viewfinder in place of the blue picture. In addition, since the apparatus of the present invention includes a character generator 29 and a focus frame generation circuit 41, the focus frame can be erased from the viewfinder and arbitrary character information can be displayed during detachment of the lens unit LU from the camera main-body unit CU.

According to the present invention, as described above, the state of the lens unit attached to or detached from the camera main-body unit is determined, and an image pickup signal and a desired video output not associated with this image pickup signal are switched in accordance with this determination result, thereby outputting the selected signal. The state of the lens unit attached to or detached from the camera main-body unit can be easily detected, thereby preventing a photographic failure and causing the user to feel unnecessary anxiety or discomfort.

The sixth embodiment of the present invention will be described below.

A video camera of this embodiment is a video camera having a photographic lens detachably mounted on a camera main-body unit. The video camera comprises a means for discriminating whether the lens is set in a lens controllable or uncontrollable state, and a control means for prohibiting picture recording when the lens is set in the uncontrollable state, wherein picture recording is prohibited when the lens is set in the lens uncontrollable state.

Figure 4:
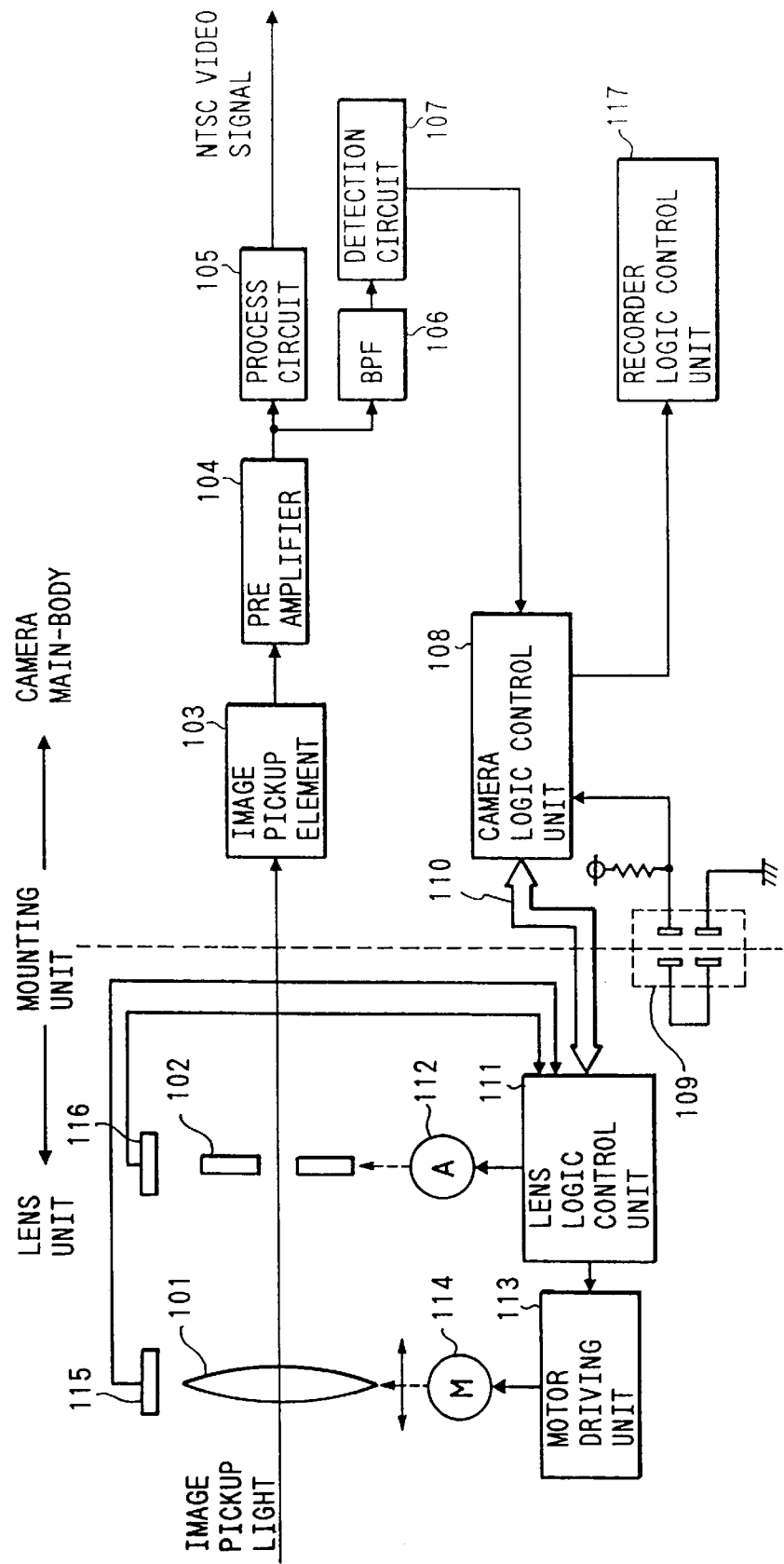
FIG. 4 is a block diagram showing the sixth embodiment of the present invention.

FIG. 4 is a block diagram showing an arrangement of a lens-interchangeable video camera which employs an image pickup apparatus according to the present invention. This video camera uses a mounting unit as a coupling unit and includes a lens unit detachably mounted on the camera main-body unit. Referring to FIG. 4, the video camera includes a photographic lens 101, an iris 102, an image pickup element 103, a preamplifier 104 for amplifying a signal output from the image pickup element 103, a process circuit 105 for processing the amplified signal and outputting a video signal of, e.g., an NTSC scheme from the process circuit 5, a band-pass filter (BPF) 106 for limiting the band of an output from the preamplifier 4, a detection circuit 107 for receiving a band-limited signal, a camera logic control unit 108 for performing auto-focus control and auto-iris control, a discrimination switch 109, serving as a discriminating means for discriminating whether the lens unit is in a lens controllable or uncontrollable state, for discriminating whether the lens unit is appropriately attached to the camera main-body unit, a communication line 110 for performing control communication between the camera main-body unit and the lens unit, a lens logic control unit 111 for performing control in the lens unit, an iris driving means 112 for driving the iris 102, a motor driving unit 113 for driving a motor 114 for driving the lens 101 in a direction indicated by an arrow, a zoom/focus encoder 115 for detecting zoom and focus states, and a recorder logic control unit 117 for controlling picture recording.

The camera logic control unit 108 constitutes a control means for prohibiting picture recording when the lens unit is set in a lens uncontrollable state during picture recording.

An operation of the video camera having the above arrangement will be described below.

Image pickup light from an object to be photographed is incident on the image pickup element 103 through the lens 101 and the iris 102. An object image is formed on the light-receiving surface of the image pickup element 103. This object image is photoelectrically converted into a video signal by the image pickup element 103. The video signal is input to the preamplifier 104 and is amplified to an appropriate level by the preamplifier 104. The amplified signal is input to the process circuit 105. The process circuit 105 converts the input signal into a video signal complying with the NTSC scheme. The NTSC video signal is output to an external circuit.

An output from the preamplifier 104 is also input to the BPF 106, so that a high-frequency component contained in the video signal is extracted by the BPF 106. A signal corresponding to an absolute value of the high-frequency component is generated by the detection circuit 107 and is input to the camera logic control unit 108 as auto-focus and auto-iris control signals. The camera logic control unit 108 arithmetically processes the input signal to generate auto-focus control data and auto-iris control data. When it is determined from signal from the discrimination switch 109 that the lens unit is attached to the camera main-body unit, the control data are transmitted to the lens logic control unit 111 through the communication line 110. The lens logic control unit 111 operates the iris driving means 112 in accordance with the input control data and operates the motor 114 through the motor driving unit 113. The focus and iris states controlled by these control data are detected by the encoders 115 and 116, and the detection signals are transmitted from the lens logic control unit 111 to the camera logic control unit 108 through the communication line 110.

The camera logic control unit 108 prohibits picture recording, as described above, when the lens unit is set in a lens uncontrollable state. More specifically, when the communication data from the lens logic control unit 11 is abnormal for a predetermined period of time (e.g., 0.5 sec. or more) or when a discrimination signal (i.e., a signal of L (low) level) representing that the lens unit is not attached to the camera main-body unit is input from the discrimination switch 9, the control signal is output to the recorder logic control unit 117, and picture recording is prohibited. For this reason, an unnecessary recorded portion can be eliminated, and a cumbersome operation for erasing the unnecessary portion need not be performed.

Figure 5:
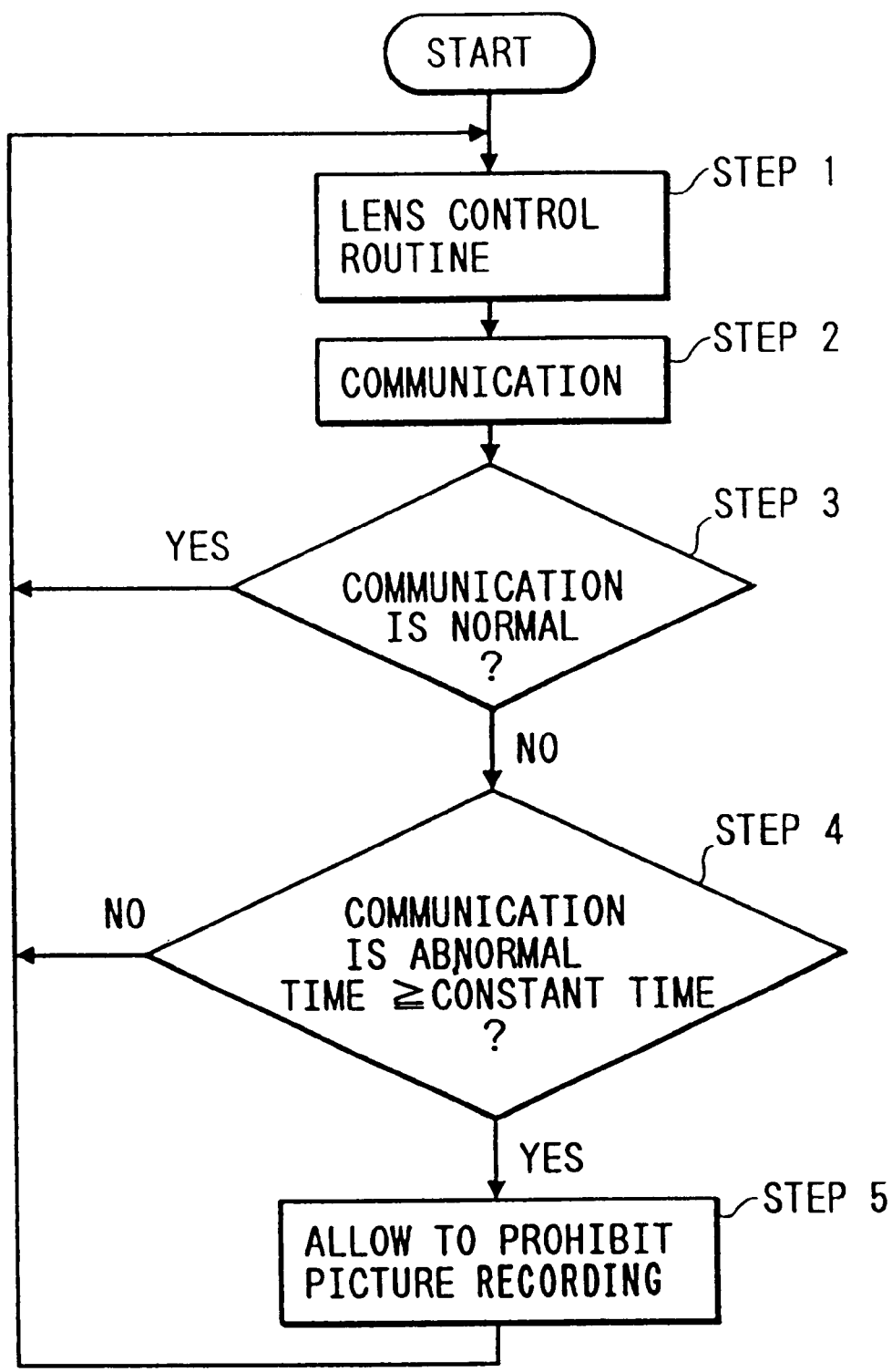
FIGS. 5 and 6 are flow charts for explaining an operation of the sixth embodiment shown in FIG. 4.

FIG. 5 is a flow chart showing processing operations of the camera logic control unit 108. When a signal from the detection circuit 107 is input, an instruction (control data) for controlling the lens unit is determined in step 1. In step 2, communication is performed to transmit this instruction to the lens unit. It is then determined in step 3 whether data communication between the lens unit and the camera logic control unit 108 is normally performed. If YES in step 3, the flow returns to step 1. However, if NO in step 3, the flow advances to step 4 to determine that communication abnormality continues for a predetermined period of time. If NO in step 4, the flow returns to step 1. However, if YES in step 4, the flow advances to step 5. In step 5, a signal which allows prohibition of picture recording is output to the recorder logic control unit 117, thereby prohibiting picture recording.

Figure 6:
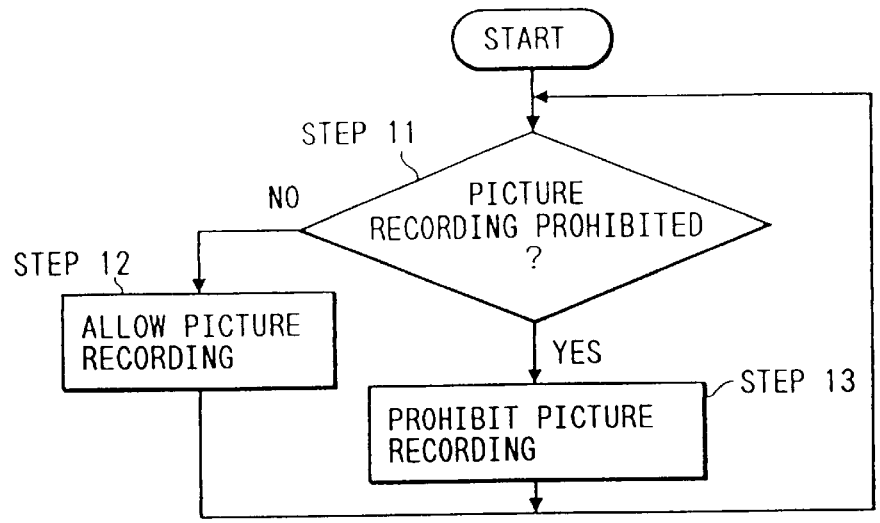

FIG. 6 is a flow chart showing an operation of the recording logic control unit 117. It is determined in step 11 whether picture recording is prohibited. If NO in step 11, the flow advances to step 12 to enable recording. However, if YES in step 11, the flow advances to step 13 to prohibit picture recording. The flow then returns to step 11, and a series of operations are repeated.

As described above, for example, when the lens unit is detached from the camera main-body unit and is set in a lens uncontrollable state, this is detected by the camera logic control unit 108 and outputs a picture recording prohibit signal to the recorder logic control unit 117. That is, when the lens unit is set in the lens uncontrollable state, picture recording is prohibited. Therefore, an unnecessary picture is not recorded upon accidental touching of the picture recording switch although a photographic state is not set in an optimal photographic state. Cumbersome operations such as cuing of an unnecessary portion need not be performed.

As described above, according to the present invention, there is provided a means for discriminating whether the lens is set in the lens uncontrollable or controllable state. When the lens is set in the uncontrollable state, picture recording is prohibited. Therefore, the unnecessary recorded portion will not be formed, and cumbersome operations for erasing the unnecessary portion can be omitted.

In the above embodiment, when normal photographic operations cannot be performed in such a case wherein the lens is detached from the camera main-body unit or incomplete electrical connections of the contacts occur, picture recording is prohibited. However, there may be provided a video camera having a photographic lens detachably mounted on the camera main-body unit and comprising a means for discriminating whether the lens is set in the lens uncontrollable or controllable state, and a control means for setting picture recording in a waiting state when the lens is set in the uncontrollable state during picture recording, wherein picture recording is set in the waiting state when the lens is set in the uncontrollable state during picture recording.

The arrangement itself of this embodiment is the same as the block diagram of FIG. 4, and a detailed description thereof will be omitted.

Figure 7:
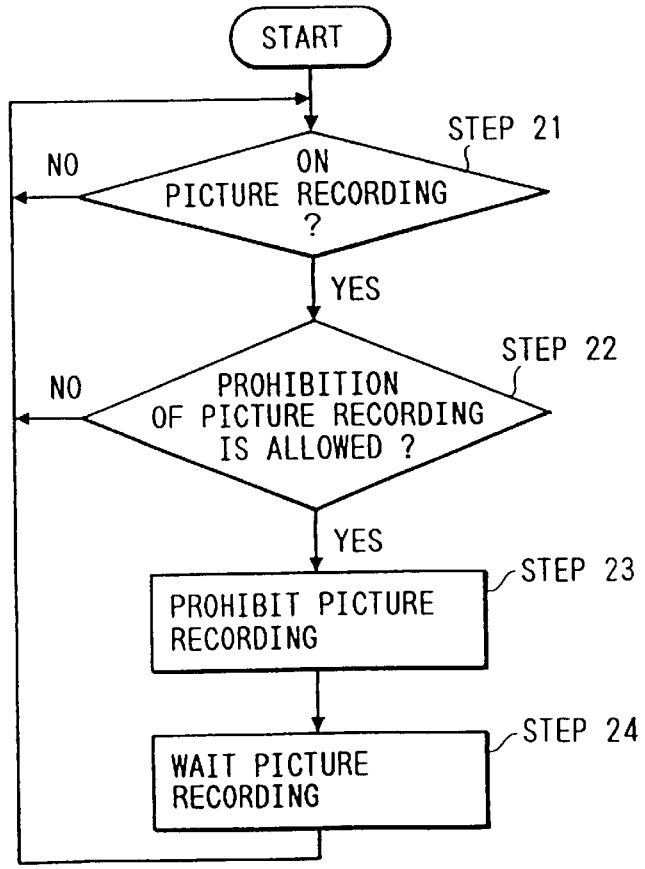
FIG. 7 is a flow chart showing the seventh embodiment of the present invention.

An operation of this embodiment different from that of FIG. 4 is an operation of a recorder logic control unit 117, and its flow chart is shown in FIG. 7. When an operation in FIG. 7 is started, it is determined in step 21 whether the video camera is set on picture recording. If NO in step 21, this operation is repeated. However, if YES in step 21, the flow advances to step 22 to determine whether a picture recording prohibit signal transmitted from a camera logic control unit 118 is a signal for allowing prohibiting of picture recording. If YES in step 22, picture recording is immediately stopped in step 23, and the picture recording waiting state is set in step 24. A series of operations described above are repeated.

In this manner, when the lens unit is almost detached from the camera main-body unit during picture recording and the lens unit is set in an uncontrollable state, this state is detected by the camera logic control unit 118, and the camera logic control unit 118 outputs a picture recording prohibit signal to the reorder logic control unit 117. That is, when the lens unit is set in the uncontrollable state during picture recording, picture recording is interrupted, and a waiting state is set. Therefore, an unnecessary picture is not recorded upon accidental touching of the picture recording switch when a photographic state is not set in an optimal photographic state. Cumbersome operations such as cuing of an unnecessary portion need not be performed. In addition, a pushbutton switch or the like need not be operated every time picture recording is interrupted.

As described above, according to the present invention, there is arranged the means for discriminating whether the lens is set in the uncontrollable or controllable state. When the lens is set in the uncontrollable state during picture recording, the waiting state is set. Therefore, the unnecessary recorded portion can be eliminated, and cumbersome operations for erasing the unnecessary portion need not be performed.

Still another embodiment of the present invention will be described below.

In a lens-interchangeable video camera system of this type, various pieces of control information and detection information representing an operating state are exchanged between a camera main-body unit and a lens unit to perform operation control.

During use of the video camera system, if the camera main-body unit is not properly connected to the lens unit, proper communication of the control information cannot be performed.

In a conventional interchangeable lens system, the presence/absence of a lens can be visually checked at once, so that no warning means for warning the attachment state is provided.

Along with developments of multifunctional video equipments, the lens unit has functions required to perform advanced and complicated control such as high-magnification powered zooming, and auto-focusing, auto-iris control as standard functions. The lens unit comprises a control microprocessor and performs various control operations through a communicating means for performing data communication with the camera main-body unit.

An interface between the lens unit and the camera main-body unit is complicated. It is difficult to determine from the outer appearance whether the lens unit is properly attached to the camera main-body unit. Even if the lens looks as if it is properly attached to the camera main-body unit, incomplete attachment may cause abnormal communication or entire malfunction of the lens-or leads to operation errors. When an operator or user notices it too late, he or she misses a shutter chance.

For this reason, in this embodiment, it is determined whether the lens unit is properly attached to the camera main-body unit to perform warning. At the same time, in a VTR mode wherein no photography is performed with a camera, since a determination display for the state of the lens unit attached to or detached from the camera main-body unit need not be performed, it is selected whether a warning display is performed in accordance with an operating mode of the video camera so as to not to perform a wasteful display on an electronic viewfinder or the like.

More specifically, in this embodiment,.there is disclosed an interchangeable lens type camera apparatus comprising a lens unit, a camera main-body unit on which the lens unit is detachably mounted, a detecting means for detecting an attachment state of the lens unit with respect to the camera main-body unit, a means for determining whether warning is performed when a nonattachment state of the lens unit is detected by the detecting means, and a display means for performing the warning on the basis of an output from the determining means, and there is also provided an interchangeable lens type camera apparatus comprising a lens unit, a camera main-body unit on which the lens unit is mounted, a communicating means for transmitting drive control information from the camera main-body unit to the lens unit and sending back information representing an operating state of the lens unit to the camera main-body unit, a first detecting means for detecting an attachment state of the lens unit with respect to the camera main-body unit, a second detecting means for detecting an attachment state of the lens unit with respect to the camera main-body unit through the communicating means, and a display means for performing warning upon detection of a nonattachment state of the lens unit on the basis of detection results from the first and second detecting means.

The user can properly know that the lens unit is properly attached to the camera main-body unit without relying on visual observation of the outer appearance. Inoperative states due to operation errors and incomplete mounting can be properly prevented in advance. At the same time, the presence/absence of the display can be selected in accordance with an operating mode of the camera apparatus. Unnecessary display operations are omitted to prevent interruption in operations.

The interchangeable lens type camera apparatus of this embodiment will be described with reference to the corresponding accompanying drawings.

Figure 8:
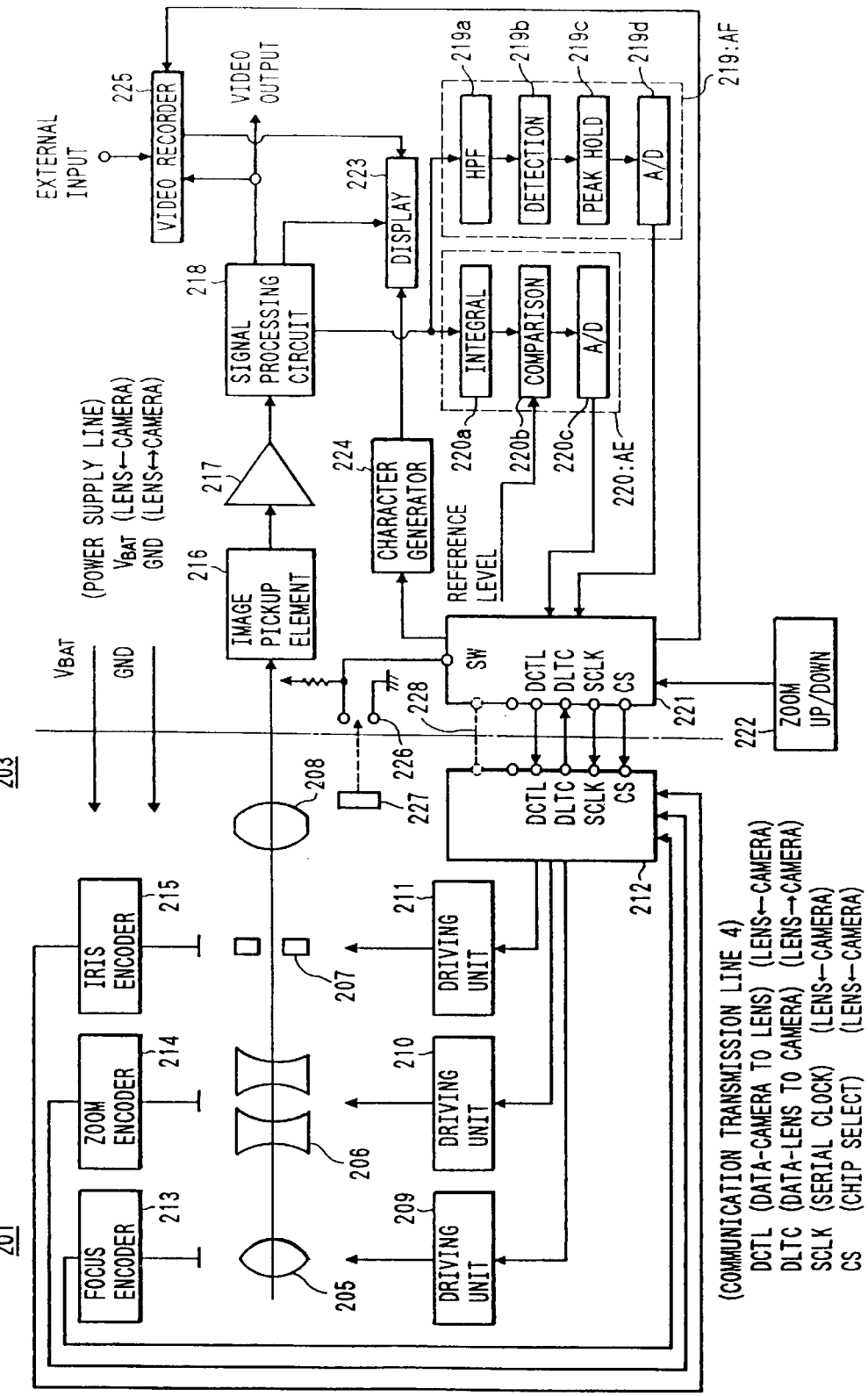
FIG. 8 is a block diagram showing the eighth embodiment according to the present invention.

FIG. 8 is a block diagram showing an arrangement of the interchangeable lens type camera apparatus of this embodiment.

Referring to FIG. 8, the camera apparatus comprises a lens unit (to be briefly referred to as a lens hereinafter) 201 and a camera main-body unit 202. The lens 201 and the camera main-body unit 202 are detachably connected through a mounting unit 203. When they are connected to each other, a power supply terminal $V_{BAT}$ for supplying a power supply voltage from the camera side to the lens side and a ground (GND) terminal are connected to corresponding lens terminals. The power supply voltages can be supplied from the camera side to the lens side. At the same time, a communication transmission line 204 is formed to bidirectionally transmit various pieces of information such as initial information and control information through electrical contacts arranged in the mounting unit 203.

This communication transmission line 204 comprises a DCTL (Data-Camera To Lens) terminal for transmitting data from the camera side to the lens side, a DLTC (Data-Lens To Camera) terminal for sending back data from the lens side to the camera side, an SCLK (Serial Clock) terminal for supplying a serial sync clock signal for performing serial communication of control information between the camera and the lens, and a CS (Chip Select) terminal for supplying a chip select signal serving as a trigger signal for acknowledging the start of communication from the camera side serving as the master side in serial communication to the lens side serving as the slave side.

The lens unit 201 includes a focusing lens 205 for performing focus control, a zoom lens 206 for performing zooming by variably changing the magnification, an iris 207, lenses including a relay lens 208, and driving units 209, 210, and 211 comprising motors and driving circuits for driving the focusing lens, the zoom lens, and the iris. These driving units are driven and controlled on the basis of control information supplied from the camera side to the lens side through the communication transmission line 204 under the control of a control microcomputer 212 for systematically controlling all the parts in the lens.

Operating states of the focusing lens, the zoom lens, and the iris are respectively detected by a focus encoder 213, a zoom encoder 214, and an iris encoder 215. Detection signals from these encoders 213, 214, and 215 are fetched by the lens microcomputer 212 and are processed in accordance with predetermined processing as needed. The processed data are transmitted from the lens side to the camera side through the communication transmission line 204.

The camera main-body unit 202 includes an image pickup element 216 such as a CCD for photoelectrically converting an object image focused by the lens 1 into a video signal, a preamplifier 217 for amplifying the video signal output form the image pickup element 216 into a predetermined level, a signal processing circuit 218 for performing predetermined processing such as predetermined gamma correction, blanking processing, and an addition of a sync signal to the output signal from the preamplifier 217, an AF circuit 219 for detecting a focus state on the basis of a high-frequency component of a luminance signal derived from the video signal, an AE circuit 220 for comparing an average value of luminance signal levels of the video signal with a predetermined reference level, and outputting a signal for controlling the iris so that the luminance signal level is set to be always equal to the reference level, a control microcomputer 221 for systematically controlling all the functions of the camera side, and a zoom switch 222 for generating a command for operating the zoom lens.

A focus state detection signal output from the AF circuit 219, an iris state detection signal output from the AE circuit 220, and an operation signal from the zoom switch 222 are fetched by the microcomputer 221. The microcomputer 221 performs predetermined arithmetic operations with reference to the operating state information sent back from the lens side. The input signals are converted into signal having a format supplied to the lens side. The converted signals are transmitted to the lens side through the communication transmission line 204, thereby controlling the lens side.

Each function described above will be briefly described. In the AF circuit 219, the high-frequency component of the luminance signal of the video signal changing in accordance with an in-focus state is extracted through a high-pass filter (HPF) 291, and the extracted high-frequency component is detected by a detection circuit 219*b* and is converted into a DC level thereby. The peak value of the DC level is detected by a peak hold circuit 219*c* every predetermined interval. The peak value is converted into a digital signal by an A/D converter 219*d*. This digital signal is supplied to the microcomputer 221. The microcomputer 221 detects the peak value of the high-frequency component every predetermined interval and calculates control information for driving the focusing lens in a direction to maximize the peak value in consideration of the depth of field with reference to the iris information from the lens side. The calculated control information is output to the lens side.

In the AE circuit 220, an integral circuit 220*a* integrates the luminance signal component Y-C separated by a low-pass filter and the like in the signal processing circuit to obtain light amount information. A comparison circuit 220*b* compares the resultant light amount information with a predetermined reference level. A difference between the light amount information and the predetermined reference level is converted into a digital signal by an A/D converter 220*c*. This digital signal is input to the microcomputer 221.

The microcomputer 221 generates a control signal for driving the iris so that the brightness signal level is set equal to the reference level.

On the lens side, the iris driving unit in the lens is driven on the basis of this control signal. As a result, an amount of light incident on the camera side is changed, and a control loop for obtaining a final optimal iris value is formed.

A monitor or display 223 serves as an image pickup monitor on the camera side, a reproduced image monitor in an apparatus having a reproduction function, or a display such as an electronic viewfinder for displaying control information representing each operating state and various pieces of warning information representing the presence/absence of mounting of the lens. A character generator 224 displays various characters and symbols on the screen of the display 223 in accordance with a command from the microcomputer 221.

A recording/reproducing apparatus such as a video tape recorder (to be referred to as a video recorder hereinafter) 225 is incorporated in the camera main-body unit or is externally connected thereto. A video signal output from the camera main-body unit is recorded on a recording medium such as a magnetic tape. The recorded information can be reproduced from the magnetic tape, or an external input can be recorded on the magnetic tape.

The functions on the lens and camera sides have been described above. Communication of control information between the lens unit and the camera unit will be described below.

Communication and control of control information can be performed between microcomputers respectively arranged in the lens and the camera main-body unit.

Figure 9:
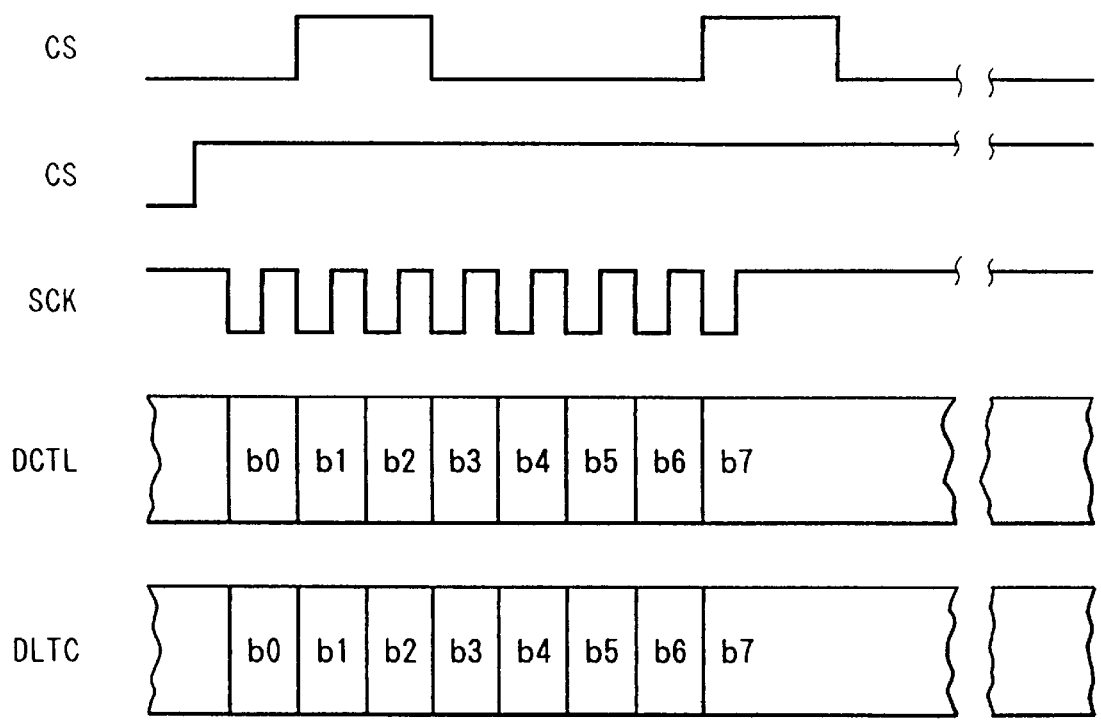
FIG. 9 is a timing chart showing communication timings of control information between a camera main-body unit and a lens unit.

FIG. 9 is a timing chart showing control communication waveforms between the camera main-body unit and the lens. Since communication of control information is serially performed in synchronism with a vertical sync signal because it processes a video signal. This communication is bidirectional communication in one field.

The lens microcomputer serves as a slave microcomputer, and the camera microcomputer serves as a master microcomputer. Bidirectional communication is performed only during an ON period of the chip select terminal CS.

The communication is performed in synchronism with a clock signal transmitted from the camera main-body unit through a serial clock terminal SCLK. A lens control information signal DCTL is transmitted from the camera main-body unit to the lens side through the DCTL terminal. A status signal representing a control state of the lens is transmitted from the lens side to the camera through the DLTC terminal as a signal DLTC.

In this communication, the control information signal and the status signal as transmission signals are transmitted in the form of packets. When the chip select signal CS is output with a lapse of a predetermined period of time in synchronism with the vertical sync signal, data communication intervals of DCTL and DLTC between the camera and the lens is repeatedly performed in synchronism with the serial clock signal SCLK in units of predetermined communication words (each word consists of data of eight bits $b_0$ to $b_7$).

A lens attachment detection switch 226 is arranged in the mounting unit 203 and detects whether the lens is perfectly attached to the camera main-body. Detection information from the detection switch 226 is supplied to the microcomputer 221. An operation element 227 is arranged on the lens side and detects that the lens unit is perfectly attached to the camera main-body unit, thereby turning on the switch 226.

When the lens is perfectly attached to the camera main-body unit, the switch 226 is turned on by the operation element 227, and a change in signal level from high to low is input to the camera microcomputer 221, thereby detecting perfect attachment of the lens.

An operation of the camera microcomputer 221 in this embodiment will be described with reference to a flow chart in FIG. 10.

Referring to FIG. 10, when a power switch on the camera side is turned on (step 31), a state of the lens attachment detection switch 226 is determined (step 32). If it is determined that the lens is perfectly attached to or mounted on the camera main-body unit, communication between the camera and the lens is started. The camera microcomputer 221 starts DCTL initial communication comprising request commands such as lens specifications, lens attributes, and specifications (e.g., AF, AE, and zoom) of each unit in the lens. These commands are transmitted to the lens microcomputer 212 (step 33).

In response to this initial communication, it is determined in step 34 whether communication between the camera and the lens can be performed, in accordance with whether the DLTC initial status signal is sent back from the lens side. If it is determined that the initial DLTC communication information is received and that the lens unit is properly mounted on the camera main-body unit in a communicable state, lens nonattachment or nonmounting warning is canceled (step 35). DCTL and DLTC control communication operations for various control units such as the AF, AE, and zoom circuits in the lens unit are started, and an operative state is set (step 36).

A determination method by the above communication may be a method of determining whether a prescribed number of clock pulses is output, or a method of detecting whether a predetermined content such as a lens ID (Identification code) is sent back.

On the other hand, in step 32, when the lens mounting detection switch 226 is not turned on and perfect attachment of the lens is not confirmed, it is determined whether the operating mode of the apparatus is a camera mode for operating the lens to set a photography enable mode or a video recorder mode (to be referred to as a VTR mode) for enabling reproduction of recorded information or recording of external input information in the video recorder section (step 37). If the camera mode is determined to be set, for example, the character generator is operated to display a warning display "LENS" or the like so as to warn that the lens is not perfectly mounted on the camera main-body unit (step 38). The flow then returns to step 32.

If it is determined in step 37 that the mode is set in the VTR mode, the flow advances to step 35 to cancel warning. More specifically, in the VTR mode, the lens need not be attached to the camera main-body unit because photography need not be performed. In this state, a display as a result of attachment detection of the lens has no meaning. For example, if a warning message is displayed on the display during reproduction, it may degrade readability of the image reproduced on the screen. Therefore, any display operation is not performed.

According to the camera apparatus of the present invention, since the physical detecting means such as a switch for detecting attachment of the lens and the electrical detecting means utilizing communication are simultaneously used, detection reliability can be improved. In addition, concomitant effects can be obtained such that contamination and defects of contacts, and lens failures can be easily detected, thus providing advantageous industrial effects, During reproduction of the recorded information, a warning display "LENS" does not appear on the monitor, and image quality will not be degraded. Therefore, the present invention is effective in a camera built-in video tape recorder.

According to the above embodiment, the mechanical lens mounting detection switch is provided between the lens and the camera main-body unit. However, a lens mounting detection switch is not limited to this. For example, as indicated by a dotted line in FIG. 8, an electric contact 28 which is electrically rendered conductive upon attachment of the lens may be arranged in a mounting unit 303 between the lens unit and the camera main-body unit, and its connection may be detected between the microcomputers of the lens and the camera.

The lens mounting detecting means may be one of the two detection systems described above.

In the flow chart in FIG. 10, in step 37 for determining whether warning is performed or not, a step of performing warning in accordance with whether the mode is set in the camera or VTR mode may be provided, or a switch for canceling the warning may be arranged, thereby determining whether warning is required or not in accordance with a state of this switch.

In the warning display of step 38, in addition to warning by means of a character or an LED, a camera output image is displayed on a monochrome background to mask an image having poor quality. Various changes and modifications may be made within the spirit and scope of the invention.

This embodiment exemplifies a camera built-in video tape recorder. However, the present invention is not limited to this embodiment. The present invention is applicable to an interchangeable lens type camera system such as a silver chloride film type still camera and an electronic still camera.

As described above, in the interchangeable lens type camera apparatus, mounting detection of the lens unit to be attached to the camera main-body unit is performed. If nonmounting of the lens is detected, a warning display is performed. The mounting state of the lens can be accurately and easily determined. In addition, since whether a warning display for nonmounting of the lens is performed is selected in accordance with the mode of the apparatus, the warning display is not output during reproduction of the recorded information, and the image quality is not degraded. Therefore, the present invention is particularly effective in a camera built-in video tape recorder or the like.

In addition, since two detecting means for lens mounting are simultaneously performed, detection reliability is improved, and concomitant effects can be obtained such that contamination and defects of the contacts as well as lens failures can be easily found, thus providing advantageous industrial effects.

The presence/absence of the warning display can be determined in accordance with a camera operation mode, and readability of the image on the monitor will not be degraded by an unnecessary display.

What is claimed is:

1. A camera detachably mounting a photographic lens thereon, comprising:

communication means for communicating control information for controlling said lens with a microcomputer of said lens mounted on said camera;

discriminating means for discriminating on the basis of a communication condition of the control information whether said lens is in an uncontrollable condition for a predetermined time during a photographing operation;

picture recording means for electrically recording a picture picked up by the photographing operation;

pattern generation means for generating a predetermined color pattern; and control means for inhibiting a picture recording operation of said picture recording means and an operation of said lens and switching an output to a monitor display from the picture to the predetermined color pattern in the case that the discriminating means discriminates that said lens is in the uncontrollable condition for the predetermined time.

2. A camera according to claim 1, wherein said control means has a camera microcomputer for controlling an entire camera system, and wherein said discriminating means is provided in said camera microcomputer.

3. A camera according to claim 2, wherein said lens includes a focus lens, focus lens driving means, an iris, iris driving means and a lens microcomputer for controlling said focus lens driving means and said iris driving means on the basis of control information transmitted from said camera microcomputer.

4. A camera according to claim 3, wherein said lens microcomputer controls said focus lens driving means and said iris driving means on the basis of control information from the camera.

5. A camera according to claim 3, further comprising a focus encoder for detecting a position of said focus lens and an iris encoder for detecting a position of said iris, wherein said lens microcomputer provides information of said focus encoder to said camera microcomputer through communication performed by said communication means.

6. A camera according to claim 3, wherein said communication is performed by said communication means which is provided between said camera microcomputer and said lens microcomputer in response to mounting of the lens on said camera.

7. A camera according to claim 1, wherein said camera includes image pickup means for photoelectrically converting an image formed by said lens to an image signal and said picture recording means performs a predetermined processing on the image signal outputted from said image pickup means and records the processed image signal on a recording medium.

8. A camera according to claim 7, wherein said microcomputer inhibiting a recording operation of said picture recording means when communication between the lens and said camera is not performed for a predetermined time.

9. A camera having an image taking lens detachable mounted on a camera main-body, comprising:

camera control means provided in said camera main-body;

communication means for communicating control information between said camera control means and said lens mounted on said camera main-body;

recording means for electrically recording an image formed by said image taking lens;

producing means for producing a predetermined color pattern signal and outputting the predetermined color signal to a display device;

discriminating means for discriminating whether a lens control operation by said camera control means is in an uncontrollable condition for a predetermined time during an image photographing operation; and control means for controlling said recording means so as to inhibit an outputting operation for image recording operation and controlling said producing means to produce and output the predetermined color signal to said display device in the case that said discriminating means discriminates that the lens control operation by said camera control means is in the uncontrollable condition for the predetermined time.

10. A camera according to claim 9, wherein said camera main-body has camera logic control means for controlling an entire camera system, and wherein said discriminating means is provided in said camera logic control means.

11. A camera according to claim 10, wherein said lens includes a focus lens, focus lens driving means, an iris, iris driving means and lens logic control means for controlling said focus lens driving means and said iris driving means on the basis of control information transmitted from said camera logic control means.

12. A camera according to claim 11, wherein said lens logic control means controls said focus lens driving means and said iris driving means on the basis of control information from the camera main-body.

13. A camera according to claim 11, further comprising a focus encoder for detecting a position of said focus lens and an iris encoder for detecting a position of said iris, wherein said lens logic control means provides information of said focus encoder and said iris encoder to said camera logic control means through communication performed by said communication means.

14. A camera according to claim 13, wherein said communication is performed by said communication means which is provided between said camera logic control means and said lens logic control means in response to mounting of said lens on said camera main-body.

15. A camera according to claim 14, wherein said camera main-body includes image pickup means for photoelectrically converting the image formed by said lens to an image signal and processing means for performing a predetermined processing on the image pickup signal outputted from said image pickup means, and said recording means records the processed image signal on a recording medium.

16. A camera according to claim 9, wherein said discriminating means inhibits a recording operation of the image signal when said communication between said lens and said camera main-body is not performed for a predetermined time.

17. An image sensing apparatus having a main-body for controlling an accessory detachably connected to said main-body, comprising:
   a controller provided in said main-body for controlling said accessory so as to sense an image formed on an image sensing plane;
   communication means for communicating control information between said controller of said main-body and said accessory connected to said main-body in a predetermined period of time;
   outputting means, provided in said main-body, for outputting an image signal corresponding to the image;
   pattern generation means for generating a predetermined color pattern signal different from the image signal; and
   discriminating means for discriminating on the basis of communication of the control information whether the control operation of said accessory by said controller is in an uncontrollable condition for a predetermined time during an operation of said outputting means,
   wherein said controller inhibits an outputting operation of said outputting means for outputting the image signal and causes said pattern generation means to generate and output the predetermined color pattern in the case that said discriminating means discriminates that the control operation of said accessory by said controller is in the uncontrollable condition for the predetermined time.

18. An apparatus according to claim 17, wherein said controller controls an entire of said main-body, and wherein said discriminating means is provided in said controller.

19. An apparatus according to claim 18, wherein said accessory having a lens, lens driving means and lens controller for controlling said lens driving means on the basis of control information transmitted from said controller.

20. An apparatus according to claim 19, further comprising an encoder for detecting a position of said lens, wherein said lens controller provides information of said encoder to said controller through communication performed by said communication means.

21. An apparatus according to claim 17, wherein said communication is performed by said communication means which is provided between said main-body and said accessory in response to connecting of said accessory to said main-body.

22. An apparatus according to claim 19, wherein said main-body includes image pickup means for photoelectrically converting the image to the image signal and recording means for performing a predetermined processing on the image signal outputted from said image pickup means and recording the processed image signal on a recording medium.

23. An apparatus according to claim 22, wherein said discriminating means inhibiting a recording operation when said communication between the lens controller and said controller is not performed for more than a predetermined time.

24. An image pickup apparatus detachably mounting an image pickup lens thereon, comprising:
   communication means for communicating control information for controlling said lens with a microcomputer of said lens mounted on said apparatus;
   discriminating means for discriminating on the basis of a communication condition of the control information, whether the lens is in an uncontrollable condition during a photographing operation;
   image recording means for recording an image; and
   control means for inhibiting a recording operation of said image recording means and an operation of said lens and generating a predetermined pattern to be displayed on a monitor display in the case that the discriminating means discriminates that said lens is in the uncontrollable condition.

25. An apparatus according to claim 24, wherein said control means has a camera microcomputer for controlling an entire image pickup system, and wherein said discriminating means is provided in said camera microcomputer.

26. An apparatus according to claim 25, wherein said lens includes a focus lens, focus lens driving means, an iris, iris driving means and a lens microcomputer for controlling said focus lens driving means and said iris driving means on the basis of control information transmitted from said camera microcomputer.

27. An apparatus according to claim 26, wherein said lens microcomputer controls said focus lens driving means and said iris driving means on the basis of the control information from the image pickup apparatus.

28. An apparatus according to claim 26, further comprising in said lens a focus encoder for detecting a position of said focus lens and an iris encoder for detecting a position of said iris, wherein said lens microcomputer provides information of said focus encoder to said microcomputer of said image pickup apparatus through communication performed by said communication means.

29. An apparatus according to claim 26, wherein communication is performed by said communication means in response to mounting of the lens on said image pickup apparatus.

30. An apparatus according to claim 24, wherein said image pickup apparatus includes an image sensor for photoelectrically converting an image formed by said lens to output an image signal and said image recording means performs a predetermined processing on the image signal outputted from the image sensor and records the processed image signal on a recording medium.

31. An apparatus according to claim 30, wherein said microcomputer inhibiting a recording operation of said image recording means when communication between the lens and said image pickup apparatus is not performed for more than a predetermined time.

32. A control method for an image pickup apparatus detachably mounting an image pickup lens thereon, comprising:
- a communication step of communicating control information for controlling said lens with a microcomputer of said lens mounted on said apparatus;
- a discriminating step of discriminating, on the basis of a communication condition of the control information, whether the lens is in a controllable condition or an uncontrollable condition during a photographing operation;
- an image recording step of recording an image photographed by said lens in the case that the discriminating step discriminates that said lens is in a controllable condition; and
- an inhibiting step of inhibiting a recording operation in said image recording step and an operation of said lens and generating a predetermined signal for displaying on a monitor display in the case that the discriminating step discriminates that said lens is in the uncontrollable condition.

33. A method according to claim 32, wherein said lens includes a focus lens, focus lens driving means, an iris, iris driving means and lens logic control means for controlling said focus lens driving means and said iris driving means on the basis of the control information transmitted from said apparatus.

34. A method according to claim 33, wherein said microcomputer of said lens controls said focus lens driving means and said iris driving means on the basis of the control information from said apparatus.

35. A method according to claim 34, wherein the communication is performed by said communication step which is provided between said apparatus and said microcomputer of said lens in response to mounting of said lens on said apparatus.

36. A method according to claim 35, wherein said image pickup apparatus includes an image sensor for photoelectrically converting the image formed by the lens to output an image signal and producing means for performing a predetermined processing on the image signal outputted from said image sensor and recording the processed image signal on a recording medium.

37. A method according to claim 36, wherein said inhibiting step inhibits a recording operation of the processed image signal when said communication between the lens and said apparatus is not performed for more than a predetermined time.

38. A video camera detachably mounting a photographic lens detachably on a camera main-body thereof, comprising:
- image pickup means for converting an image formed by said lens to an image signal;
- communication means for communicating control information with said lens mounted on said camera main-body;
- discriminating means for discriminating whether the lens is in an uncontrollable state during a photographing operation;
- recording means for recording the image signal output from said image pickup means; and
- control means for controlling said recording means so as to inhibit a recording operation of said recording means in the case that said discriminating means discriminates that said lens is in an uncontrollable state.

39. A video camera according to claim 38, wherein said camera main-body has camera logic control means for control of an entire camera system, and wherein said discriminating means is provided in said camera logic control means.

40. A video camera according to claim 39, wherein said lens includes a focus lens, focus lens driving means, an iris, iris driving means and lens logic control means for controlling said focus lens driving means and said iris driving means on the basis of control information transmitted from said camera logic control means.

41. A video camera according to claim 40, wherein said lens logic control means controls said focus lens driving means and said iris driving means on the basis of the control information from the camera main-body.

42. A video camera according to claim 40, wherein said communication means is provided between said camera logic control means and said lens logic control means in response to mounting of the lens on said camera main-body.

43. A video camera according to claim 39, wherein said recording means performs a predetermined processing on the image signal output from said image pickup means and recording the processed pickup signal on a recording medium.

44. A video camera according to claim 38, wherein said control means inhibits the recording operation of said recording means when communication between said camera main-body and said lens is not performed for a predetermined time.

45. A video camera according to claim 38, wherein said communication means performs communication at a period of a vertical synchronization signal.

* * * * *

UNITED STATES PATENT AND TRADEMARK OFFICE
CERTIFICATE OF CORRECTION

PATENT NO.   : 6,392,702 B1                                         Page 1 of 1
DATED        : May 21, 2002
INVENTOR(S)  : Hideyuki Arai et al.

It is certified that error appears in the above-identified patent and that said Letters Patent is hereby corrected as shown below:

Column 6,
Line 27, delete "for-performing" and insert -- for performing --.

Column 16,
Line 61, delete "embodiment,.there" and insert -- embodiment, there --.

Signed and Sealed this

Ninth Day of September, 2003

JAMES E. ROGAN
*Director of the United States Patent and Trademark Office*